United States Patent
Carey et al.

(10) Patent No.: US 10,009,384 B2
(45) Date of Patent: *Jun. 26, 2018

(54) INFORMATION SECURITY SYSTEMS AND METHODS

(71) Applicant: Intertrust Technologies Corporation, Sunnyvale, CA (US)

(72) Inventors: W. Knox Carey, Mountain View, CA (US); Jarl Nilsson, Mountain View, CA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/432,545

(22) Filed: Feb. 14, 2017

(65) Prior Publication Data

US 2017/0195370 A1     Jul. 6, 2017

Related U.S. Application Data

(63) Continuation of application No. 13/444,624, filed on Apr. 11, 2012, now Pat. No. 9,589,110.

(60) Provisional application No. 61/474,212, filed on Apr. 11, 2011.

(51) Int. Cl.
 G06F 7/04 (2006.01)
 G06F 17/30 (2006.01)
 H04L 29/06 (2006.01)
 H04L 9/32 (2006.01)

(52) U.S. Cl.
 CPC .......... *H04L 63/20* (2013.01); *H04L 9/3247* (2013.01)

(58) Field of Classification Search
 None
 See application file for complete search history.

(56) References Cited

U.S. PATENT DOCUMENTS

| | | | |
|---|---|---|---|
| 4,827,508 A | 5/1989 | Shear | |
| 4,977,594 A | 12/1990 | Shear | |
| 5,050,213 A | 9/1991 | Shear | |
| 5,410,598 A | 4/1995 | Shear | |
| 5,414,845 A | 5/1995 | Behm et al. | |
| 5,530,235 A | 6/1996 | Stefik et al. | |

(Continued)

FOREIGN PATENT DOCUMENTS

| | | |
|---|---|---|
| CN | 1116803 A | 2/1996 |
| CN | 1274461 A | 11/2000 |

(Continued)

OTHER PUBLICATIONS

Office Action dated Jan. 4, 2008 issued in related U.S. Appl. No. 10/863,551, filed Jun. 7, 2004.

(Continued)

*Primary Examiner* — Fatoumata Traore
(74) *Attorney, Agent, or Firm* — Finnegan, Henderson Farabow, Garrett Dunner, LLP

(57) ABSTRACT

Systems and methods for governing derived electronic resources are provided. In one embodiment, a digital resource is associated with one or more rules and a set of one or more computations, wherein the rules correspond to one or more conditions for accessing the digital resource and the computations operate upon the digital resource in order to provide a specific view of the digital resource that differs from the digital resource.

22 Claims, 5 Drawing Sheets

(56) References Cited

U.S. PATENT DOCUMENTS

| | | | |
|---|---|---|---|
| 5,534,975 A | 7/1996 | Stefik et al. |
| 5,629,980 A | 5/1997 | Stefik et al. |
| 5,634,012 A | 5/1997 | Stefik et al. |
| 5,638,443 A | 6/1997 | Stefik et al. |
| 5,673,315 A | 9/1997 | Wolf |
| 5,715,403 A | 2/1998 | Stefik |
| 5,765,152 A | 6/1998 | Erickson |
| 5,774,652 A | 6/1998 | Smith |
| 5,825,883 A | 10/1998 | Archibald et al. |
| 5,892,900 A | 4/1999 | Ginter et al. |
| 5,910,987 A | 6/1999 | Ginter et al. |
| 5,915,019 A | 6/1999 | Ginter et al. |
| 5,917,912 A | 6/1999 | Ginter et al. |
| 5,920,861 A | 7/1999 | Hall et al. |
| 5,937,041 A | 8/1999 | Cardillo et al. |
| 5,940,504 A | 8/1999 | Griswold |
| 5,941,951 A | 8/1999 | Day et al. |
| 5,943,422 A | 8/1999 | Van Wie et al. |
| 5,949,876 A | 9/1999 | Ginter et al. |
| 5,968,175 A | 10/1999 | Morishita et al. |
| 5,982,891 A | 11/1999 | Ginter et al. |
| 5,991,399 A | 11/1999 | Graunke et al. |
| 5,999,949 A | 12/1999 | Crandall |
| 6,006,332 A | 12/1999 | Rabne et al. |
| 6,023,765 A | 2/2000 | Kuhn |
| 6,044,469 A | 3/2000 | Horstmann |
| 6,052,780 A | 4/2000 | Glover |
| 6,112,181 A | 8/2000 | Shear et al. |
| 6,119,108 A | 9/2000 | Holmes et al. |
| 6,138,119 A | 10/2000 | Hall et al. |
| 6,157,721 A | 12/2000 | Shear et al. |
| 6,185,683 B1 | 2/2001 | Ginter et al. |
| 6,188,995 B1 | 2/2001 | Garst et al. |
| 6,223,291 B1 | 4/2001 | Puhl et al. |
| 6,226,618 B1 | 5/2001 | Downs et al. |
| 6,233,577 B1 | 5/2001 | Ramasubramani et al. |
| 6,233,608 B1 | 5/2001 | Laursen et al. |
| 6,237,786 B1 | 5/2001 | Ginter et al. |
| 6,240,185 B1 | 5/2001 | Van Wie et al. |
| 6,253,193 B1 | 6/2001 | Ginter et al. |
| 6,292,569 B1 | 9/2001 | Shear et al. |
| 6,363,488 B1 | 3/2002 | Ginter et al. |
| 6,389,402 B1 | 5/2002 | Ginter et al. |
| 6,427,140 B1 | 7/2002 | Ginter et al. |
| 6,449,367 B2 | 9/2002 | Van Wie et al. |
| 6,618,484 B1 | 9/2003 | Van Wie et al. |
| 6,640,304 B2 | 10/2003 | Ginter et al. |
| 6,658,568 B1 | 12/2003 | Ginter et al. |
| 6,668,325 B1 | 12/2003 | Collberg et al. |
| 6,735,253 B1 | 5/2004 | Chang et al. |
| 6,769,019 B2 | 7/2004 | Ferguson |
| 6,772,340 B1 | 8/2004 | Peinado et al. |
| 6,785,815 B1 | 8/2004 | Serret-Avila et al. |
| 6,807,534 B1 | 10/2004 | Erickson |
| 6,824,051 B2 | 11/2004 | Reddy |
| 6,832,316 B1 | 12/2004 | Sibert |
| 6,842,863 B1 | 1/2005 | Fox et al. |
| 6,850,252 B1 | 2/2005 | Hoffberg |
| 6,883,100 B1 | 4/2005 | Elley et al. |
| 6,928,545 B1 | 8/2005 | Litai et al. |
| 6,934,702 B2 | 8/2005 | Faybishenko et al. |
| 6,959,290 B2 | 10/2005 | Stefik et al. |
| 6,961,858 B2 | 11/2005 | Fransdonk |
| 6,976,164 B1 | 12/2005 | King et al. |
| 6,985,953 B1 | 1/2006 | Sandhu et al. |
| 6,996,544 B2 | 2/2006 | Sellars et al. |
| 7,036,011 B2 | 4/2006 | Grimes et al. |
| 7,089,594 B2 | 8/2006 | Lal et al. |
| 7,107,449 B2 | 9/2006 | Mont et al. |
| 7,113,912 B2 | 9/2006 | Stefik et al. |
| 7,171,558 B1 | 1/2007 | Mourad et al. |
| 7,203,966 B2 | 4/2007 | Abburi et al. |
| 7,210,039 B2 | 4/2007 | Rodgers et al. |
| 7,272,228 B2 | 9/2007 | Atkin et al. |
| 7,308,717 B2 | 12/2007 | Koved et al. |
| 7,356,690 B2 | 4/2008 | Benantar |
| 7,359,517 B1 | 4/2008 | Rowe |
| 7,389,270 B2 | 6/2008 | Stefik et al. |
| 7,389,273 B2 | 6/2008 | Inwin et al. |
| 7,484,103 B2 | 1/2009 | Woo et al. |
| 7,487,363 B2 | 2/2009 | Alve et al. |
| 7,493,289 B2 | 2/2009 | Verosub et al. |
| 7,496,757 B2 | 2/2009 | Abbott et al. |
| 7,509,492 B2 | 3/2009 | Boyen et al. |
| 7,516,331 B2 | 4/2009 | Jin et al. |
| 7,549,172 B2 | 6/2009 | Tokutani et al. |
| 7,558,759 B2 | 7/2009 | Valenzuela et al. |
| 7,574,219 B2 | 8/2009 | Rofheart et al. |
| 7,587,368 B2 | 9/2009 | Felsher |
| 7,590,863 B2 | 9/2009 | Lambert |
| 7,610,011 B2 | 10/2009 | Albrett |
| 7,631,318 B2 | 12/2009 | Cottrille et al. |
| 7,711,647 B2 | 5/2010 | Gunaseelan et al. |
| 7,873,988 B1 * | 1/2011 | Issa ................ G06F 21/10 |
| | | 726/26 |
| 8,234,387 B2 | 7/2012 | Bradley et al. |
| 8,302,178 B2 * | 10/2012 | Camiel ............ G06F 17/30082 |
| | | 713/165 |
| 8,656,178 B2 | 2/2014 | Foster et al. |
| 9,235,833 B2 | 1/2016 | Bradley et al. |
| 9,235,834 B2 | 1/2016 | Bradley et al. |
| 9,317,843 B2 | 4/2016 | Bradley et al. |
| 2001/0001147 A1 | 5/2001 | Hutchison et al. |
| 2001/0033554 A1 | 10/2001 | Ayyagari et al. |
| 2001/0042043 A1 | 11/2001 | Shear et al. |
| 2001/0051996 A1 | 12/2001 | Cooper et al. |
| 2002/0002674 A1 | 1/2002 | Grimes et al. |
| 2002/0010679 A1 | 1/2002 | Felsher |
| 2002/0023214 A1 | 2/2002 | Shear et al. |
| 2002/0044657 A1 | 4/2002 | Asano et al. |
| 2002/0048369 A1 | 4/2002 | Ginter et al. |
| 2002/0059425 A1 | 5/2002 | Belfiore et al. |
| 2002/0087859 A1 | 7/2002 | Weeks et al. |
| 2002/0108050 A1 | 8/2002 | Raley et al. |
| 2002/0112171 A1 | 8/2002 | Ginter et al. |
| 2002/0143819 A1 | 10/2002 | Han et al. |
| 2002/0144108 A1 | 10/2002 | Benantar |
| 2002/0144283 A1 | 10/2002 | Headings et al. |
| 2002/0152173 A1 | 10/2002 | Rudd |
| 2002/0157002 A1 | 10/2002 | Messerges et al. |
| 2002/0161996 A1 | 10/2002 | Koved et al. |
| 2002/0164047 A1 | 11/2002 | Yuval |
| 2002/0194081 A1 | 12/2002 | Perkowski |
| 2003/0009423 A1 | 1/2003 | Wang et al. |
| 2003/0009681 A1 | 1/2003 | Harada et al. |
| 2003/0023856 A1 | 1/2003 | Horne et al. |
| 2003/0028488 A1 | 2/2003 | Mohammed et al. |
| 2003/0037139 A1 | 2/2003 | Shteyn |
| 2003/0041239 A1 | 2/2003 | Shear et al. |
| 2003/0046244 A1 | 3/2003 | Shear et al. |
| 2003/0051134 A1 | 3/2003 | Gupta |
| 2003/0055878 A1 | 3/2003 | Fletcher et al. |
| 2003/0061404 A1 | 3/2003 | Atwal et al. |
| 2003/0065956 A1 | 4/2003 | Belapurkar et al. |
| 2003/0069748 A1 | 4/2003 | Shear et al. |
| 2003/0069749 A1 | 4/2003 | Shear et al. |
| 2003/0078891 A1 | 4/2003 | Capitant |
| 2003/0079133 A1 | 4/2003 | Breiter et al. |
| 2003/0084003 A1 | 5/2003 | Pinkas et al. |
| 2003/0084172 A1 | 5/2003 | deJong et al. |
| 2003/0105721 A1 | 6/2003 | Ginter et al. |
| 2003/0105864 A1 | 6/2003 | Mulligan et al. |
| 2003/0126086 A1 | 7/2003 | Safadi |
| 2003/0131251 A1 * | 7/2003 | Fetkovich ............ H04N 7/1675 |
| | | 713/193 |
| 2003/0135628 A1 | 7/2003 | Fletcher et al. |
| 2003/0140119 A1 | 7/2003 | Acharya et al. |
| 2003/0144859 A1 | 7/2003 | Hsu et al. |
| 2003/0145044 A1 | 7/2003 | Raivisto et al. |
| 2003/0145093 A1 | 7/2003 | Oren et al. |
| 2003/0159033 A1 | 8/2003 | Ishiguro |
| 2003/0163431 A1 | 8/2003 | Ginter et al. |
| 2003/0167236 A1 | 9/2003 | Stefik et al. |
| 2003/0172127 A1 | 9/2003 | Northrup et al. |

(56) References Cited

U.S. PATENT DOCUMENTS

| | | |
|---|---|---|
| 2003/0177187 A1 | 9/2003 | Levine et al. |
| 2003/0182235 A1 | 9/2003 | Wang et al. |
| 2003/0184431 A1 | 10/2003 | Lundkvist |
| 2003/0194093 A1 | 10/2003 | Evans et al. |
| 2003/0204645 A1 | 10/2003 | Sharma et al. |
| 2003/0207687 A1 | 11/2003 | Svedavall et al. |
| 2003/0220835 A1 | 11/2003 | Barnes |
| 2003/0220880 A1 | 11/2003 | Lao et al. |
| 2003/0225701 A1 | 12/2003 | Lee et al. |
| 2003/0226012 A1 | 12/2003 | Asokan et al. |
| 2003/0236978 A1 | 12/2003 | Evans et al. |
| 2004/0003139 A1 | 1/2004 | Cottrille et al. |
| 2004/0003270 A1 | 1/2004 | Bourne et al. |
| 2004/0003398 A1 | 1/2004 | Donian et al. |
| 2004/0024688 A1 | 2/2004 | Bi et al. |
| 2004/0054630 A1 | 3/2004 | Ginter et al. |
| 2004/0054894 A1 | 3/2004 | Lambert |
| 2004/0054912 A1 | 3/2004 | Adent et al. |
| 2004/0059951 A1 | 3/2004 | Pinkas et al. |
| 2004/0073813 A1 | 4/2004 | Pinkas et al. |
| 2004/0083262 A1 | 4/2004 | Trantow |
| 2004/0088175 A1 | 5/2004 | Messerges et al. |
| 2004/0088541 A1 | 5/2004 | Messerges et al. |
| 2004/0098580 A1 | 5/2004 | DeTreville |
| 2004/0103305 A1 | 5/2004 | Ginter et al. |
| 2004/0103312 A1 | 5/2004 | Messerges et al. |
| 2004/0107356 A1 | 6/2004 | Shamoon et al. |
| 2004/0107368 A1 | 6/2004 | Colvin |
| 2004/0117490 A1 | 6/2004 | Peterka et al. |
| 2004/0123104 A1 | 6/2004 | Boyen et al. |
| 2004/0123129 A1 | 6/2004 | Ginter et al. |
| 2004/0128499 A1 | 7/2004 | Peterka et al. |
| 2004/0128546 A1 | 7/2004 | Blakley et al. |
| 2004/0133793 A1 | 7/2004 | Ginter et al. |
| 2004/0139312 A1 | 7/2004 | Medvinsky |
| 2004/0143546 A1 | 7/2004 | Wood et al. |
| 2004/0143736 A1 | 7/2004 | Cross et al. |
| 2004/0158709 A1 | 8/2004 | Narin et al. |
| 2004/0158731 A1 | 8/2004 | Narin et al. |
| 2004/0162870 A1 | 8/2004 | Matsuzaki et al. |
| 2004/0166839 A1 | 8/2004 | Okkonen |
| 2004/0205028 A1 | 10/2004 | Verosub et al. |
| 2004/0205333 A1 | 10/2004 | Bjorkengren |
| 2004/0205765 A1 | 10/2004 | Beringer et al. |
| 2004/0216127 A1 | 10/2004 | Datta et al. |
| 2004/0230965 A1 | 11/2004 | Okkonen |
| 2004/0249768 A1 | 12/2004 | Kontio et al. |
| 2004/0254851 A1 | 12/2004 | Himeno et al. |
| 2004/0267965 A1 | 12/2004 | Vasudevan et al. |
| 2005/0004875 A1 | 1/2005 | Kontio et al. |
| 2005/0008163 A1 | 1/2005 | Leser et al. |
| 2005/0022227 A1 | 1/2005 | Shen et al. |
| 2005/0027871 A1 | 2/2005 | Bradley et al. |
| 2005/0050332 A1 | 3/2005 | Serret-Avila et al. |
| 2005/0060560 A1 | 3/2005 | Sibert |
| 2005/0060584 A1 | 3/2005 | Ginter et al. |
| 2005/0078822 A1 | 4/2005 | Shavit et al. |
| 2005/0086501 A1 | 4/2005 | Woo et al. |
| 2005/0102513 A1 | 5/2005 | Alve |
| 2005/0108555 A1 | 5/2005 | Sibert |
| 2005/0108707 A1 | 5/2005 | Taylor et al. |
| 2005/0119977 A1 | 6/2005 | Raciborski |
| 2005/0177516 A1 | 8/2005 | Vandewater et al. |
| 2005/0192902 A1 | 9/2005 | Williams |
| 2005/0204391 A1 | 9/2005 | Hunleth et al. |
| 2005/0228858 A1 | 10/2005 | Mizutani et al. |
| 2005/0228995 A1 | 10/2005 | Kwak et al. |
| 2005/0234735 A1 | 10/2005 | Williams |
| 2005/0235361 A1 | 10/2005 | Alkove et al. |
| 2005/0262520 A1 | 11/2005 | Burnett et al. |
| 2005/0262568 A1 | 11/2005 | Hansen et al. |
| 2005/0273629 A1 | 12/2005 | Abrams et al. |
| 2005/0278256 A1 | 12/2005 | Vandewater et al. |
| 2005/0278259 A1 | 12/2005 | Gunaseelan et al. |
| 2005/0289653 A1* | 12/2005 | Darling .................. H04L 9/321 726/26 |
| 2006/0015580 A1 | 1/2006 | Gabriel et al. |
| 2006/0020784 A1 | 1/2006 | Jonker et al. |
| 2006/0021065 A1 | 1/2006 | Kamperman et al. |
| 2006/0036554 A1 | 2/2006 | Schrock et al. |
| 2006/0041642 A1 | 2/2006 | Rosner et al. |
| 2006/0050870 A1 | 3/2006 | Kimmel et al. |
| 2006/0129818 A1 | 6/2006 | Kim et al. |
| 2006/0136718 A1 | 6/2006 | Moreillon |
| 2006/0150257 A1 | 7/2006 | Leung et al. |
| 2006/0173985 A1 | 8/2006 | Moore |
| 2006/0174194 A1 | 8/2006 | Miyazawa |
| 2006/0248340 A1 | 11/2006 | Lee et al. |
| 2006/0294580 A1 | 12/2006 | Yeh |
| 2007/0074270 A1 | 3/2007 | Meehan et al. |
| 2007/0083757 A1 | 4/2007 | Nakano et al. |
| 2007/0098162 A1 | 5/2007 | Shin |
| 2007/0192480 A1 | 8/2007 | Han et al. |
| 2007/0198859 A1 | 8/2007 | Harada et al. |
| 2007/0204078 A1 | 8/2007 | Boccon-Gibod et al. |
| 2007/0300070 A1 | 12/2007 | Shen-Orr et al. |
| 2008/0133417 A1 | 6/2008 | Robinson |
| 2009/0007198 A1 | 1/2009 | Lavender et al. |
| 2009/0031038 A1 | 1/2009 | Shukla et al. |
| 2009/0112867 A1 | 4/2009 | Roy et al. |
| 2010/0070774 A1 | 3/2010 | Bradley et al. |

FOREIGN PATENT DOCUMENTS

| | | |
|---|---|---|
| CN | 1371056 A | 9/2002 |
| CN | 1396568 A | 2/2003 |
| CN | 1607762 A | 4/2005 |
| CN | 1613255 A | 5/2005 |
| CN | 101216871 A | 7/2008 |
| CN | 100536559 C | 9/2009 |
| EP | 0668695 | 8/1995 |
| EP | 0 715 247 A1 | 6/1996 |
| EP | 0840194 A2 | 6/1998 |
| EP | 1 191 422 B2 | 3/2002 |
| EP | 1189432 A2 | 3/2002 |
| EP | 1724699 | 11/2006 |
| JP | 1999-143871 A | 5/1999 |
| JP | 2001-290724 | 10/2001 |
| JP | 2002-207637 A | 7/2002 |
| JP | 2003-122635 A | 4/2003 |
| JP | 2003-228560 A | 8/2003 |
| JP | 2004-287994 | 10/2004 |
| JP | 2005-515724 A | 5/2005 |
| JP | 2005-259015 A | 9/2005 |
| JP | 2006-185311 A | 7/2006 |
| JP | 2007-066302 A | 3/2007 |
| JP | 2009-026013 A | 2/2009 |
| JP | 2009-508240 A | 2/2009 |
| JP | 2009-176253 A | 8/2009 |
| JP | 2012-53913 | 3/2012 |
| TW | 1229559 | 3/2005 |
| TW | 200512592 A | 4/2005 |
| WO | WO 1996/27155 A2 | 9/1996 |
| WO | WO 1997/41654 A2 | 11/1997 |
| WO | WO 1997/43761 A1 | 11/1997 |
| WO | WO 1998/09209 A2 | 3/1998 |
| WO | WO 1998/10381 A1 | 3/1998 |
| WO | WO 1998/37481 A1 | 8/1998 |
| WO | WO 1999/01815 A1 | 1/1999 |
| WO | WO 1999/005600 A2 | 2/1999 |
| WO | WO 1999/24928 A1 | 5/1999 |
| WO | WO 1999/48296 A1 | 9/1999 |
| WO | WO 2000/75925 A1 | 12/2000 |
| WO | WO 2001/06374 A1 | 1/2001 |
| WO | WO 2001/09702 A1 | 2/2001 |
| WO | WO 2001/10076 A1 | 2/2001 |
| WO | WO 2001/80472 | 10/2001 |
| WO | WO 2001/086462 A1 | 11/2001 |
| WO | WO 2002/078238 | 10/2002 |
| WO | WO 2002/84975 A2 | 10/2002 |
| WO | WO 2002/93290 A2 | 11/2002 |
| WO | WO 2003/034408 A2 | 4/2003 |
| WO | WO 2003/044716 A2 | 5/2003 |

(56) References Cited

FOREIGN PATENT DOCUMENTS

| WO | WO 2004/008297 A1 | 1/2004 |
|---|---|---|
| WO | WO 2004/027588 A2 | 4/2004 |
| WO | WO 2004/030311 A1 | 4/2004 |
| WO | WO 2004/038568 A2 | 5/2004 |
| WO | WO 2004/055650 A1 | 7/2004 |
| WO | WO 2004/059451 A1 | 7/2004 |
| WO | WO 2004/070538 A2 | 8/2004 |
| WO | WO 2005/017654 A2 | 2/2005 |
| WO | WO 2005/055009 A2 | 6/2005 |
| WO | WO 2006/118391 A1 | 11/2006 |
| WO | WO 2007/043015 A2 | 4/2007 |

OTHER PUBLICATIONS

Office Action dated Jun. 28, 2008 issued in related U.S. Appl. No. 10/863,551, filed Jun. 7, 2004.
Office Action dated Apr. 14, 2009 issued in related U.S. Appl. No. 10/863,551, filed Jun. 7, 2004.
Office Action dated Dec. 8, 2009 issued in related U.S. Appl. No. 10/863,551, filed Jun. 7, 2004.
Office Action dated Sep. 11, 2009 issued in related U.S. Appl. No. 11/804,667, filed May 17, 2007.
Office Action dated Jan. 6, 2010 issued in related U.S. Appl. No. 11/829,751, filed Jul. 27, 2007.
Office Action dated Feb. 3, 2010 issued in related U.S. Appl. No. 11/894,624, filed Aug. 20, 2007.
Office Action dated Oct. 23, 2008 issued in related U.S. Appl. No. 11/894,372, filed Aug. 20, 2007.
Office Action dated Jun. 10, 2009 issued in related U.S. Appl. No. 11/894,372, filed Aug. 20, 2007.
Office Action dated Nov. 13, 2009 issued in related U.S. Appl. No. 11/894,372, filed Aug. 20, 2007.
Office Action dated Nov. 14, 2008 issued in related U.S. Appl. No. 11/929,937, filed Oct. 30, 2007.
International Search Report dated Feb. 1, 2006 issued in related International Application No. PCT/US04/18120.
International Preliminary Examination Report dated Jul. 17, 2006, issued in related International Application No. PCT/US04/18120.
Examiner's First Report dated Mar. 30, 2009 issued in related Australian Application No. 2004264582.
English translation of Office Action dated Apr. 3, 2009 issued in related Chinese Patent Application No. 200480021795.9.
English translation of Office Action dated Oct. 15, 2009 issued in related Chinese Patent Application No. 200480021795.9.
Supplementary European Search Report completed Apr. 14, 2008 issued in related European Application No. 04776350.3.
Examination Report dated Sep. 17, 2009 issued in related European Application No. 04776350.3.
English translation of Notice of Reasons for Rejection dated Jul. 14, 2009 issued in related Japanese Patent Application No. 2006-509076.
English translation of Notice of Grounds for Rejection dated Feb. 10, 2010 issued in related Korean Application No. 2005-7023383.
English translation of Official Action issued in related Eurasian Application No. 200700510/27.
Chinnici, Roberto et al., "Web Services Description Language (WSDL) Version 1.2, Part 1: Core Language", W3C Working Draft, Jun. 11, 2003, 78 pages.
Curbera et al., "Using WSDL in a UDDI Registry, Version 1.07," UDDI Best Practice, found online at http://www.uddi.org/pubs/wsdlbestpractices-V1.07-Open_20020521.pdf, May 21, 2002.
Erickson, J.S., "Toward an Open Rights Management Interoperability Framework", Yankee Book Peddler, Inc. Jun. 24, 1999.
Erikson, J.S., "A Digital Object Approach to Interoperable Rights Management: Fine-grained Policy Enforcement Enabled by a Digital Object Infrastructure," D-Lib Magazine, Jun. 2001, 18 pages, vol. 7, No. 6, available at http://www.dlib.org/dlib/june01/erickson/06erickson.html.

Gudgin, M. et al., "SOAP Version 1.2 Part 2: Adjunts, W3C Recommendation Jun. 24, 2003," W3C, pp. 1-58. from http://www.w3.org/TR/2003/REC-soap12-part2-20030624/ on Nov. 4, 2001.
http://en.wikipedia.org/wiki/Authorization Certificate, Sep. 27, 2003.
http://en.wikipedia.org/wiki/Public key Certificate, Sep. 27, 2008.
Peltz, C., "web services orchestration: a review of emerging technologies, tools, and standards." Hewlett Pachard, Co., Jan. 2003: pp. 1-19.
Sibert, O. et al., "Digibox: A Self-Protecting Container for Information Commerce," Proceedings of the First USENIX Workshop on Electronic Commerce, Jul. 1995, 13 pages, New York, NY.
Sibert, O. et al., "Securing the Content, Not the Wire, for Information Commerce," 1996, 12 pages, InterTrust Technologies Corporation.
Stefik, M., "Introduction to Knowledge Systems, Chapter 7: Classification," 1995, pp. 543-607, Morgan Kaufmann Publishers, Inc., San Francisco, CA.
Stefik, M., "Letting Loose the Light: Igniting Commerce in Electronic Publication," 1994-1995, 37 pages, Xerox PARC, Palo Alto, CA.
Stefik, M., "Letting Loose the Light: Igniting Commerce in Electronic Publication," Internet Dreams: Archetypes, Myths, and Metaphors, 1996, pp. 219-253, Massachusetts Institute of Technology.
Stefik, M., "Trusted Systems," Scientific American, Mar. 1997, pp. 78-81.
Swenson, K., "Process Management Standards Overview," Fujitsu Software Corporation, 26 pages, 2004.
Zur Meuhlen, M. et al., "Developing Web Services Choreography Standards—The Case of REST vs. SOAP," Decision Support Systems, vol. 40, Issue 1, Jul. 1, 2005, pp. 9-29.
Office Action dated May 12, 2010 issued in related U.S. Appl. No. 10/863,551, filed Jun. 7, 2004.
International Search Report dated Aug. 13, 2007, for International Application No. PCT/US2006/040898, filed Oct. 18, 2006.
International Preliminary Report on Patentability dated Apr. 23, 2008, for International Application No. PCT/US2006/040898, filed Oct. 18, 2006.
European Search Report and European Search Opinion completed Jul. 2, 2009, for European Application No. EP09156631.5.
Hancke et al., "An RFID Distance Bounding Protocol," Proceedings of IEEE/Create-Net SecureComm 2005, [Online] URL:http://www.rfidblog.org.uk/ RFIDdistancebound-Securecomm2005.pdf.
Office Action dated Jan. 13, 2010 for U.S. Appl. No. 11/583,693, filed Oct. 18, 2006.
Office Action dated Apr. 19, 2010 issued in related U.S. Appl. No. 11/804,667, filed May 17, 2007.
Office Action dated Mar. 31, 2010 issued in related U.S. Appl. No. 11/829,805, filed Jul. 27, 2007.
Office Action dated Feb. 17, 2009 issued in related U.S. Appl. No. 11/583,671, filed Oct. 18, 2006.
Office Action dated Nov. 24, 2009 issued in related U.S. Appl. No. 11/583,671, filed Oct. 18, 2006.
Bradley et al., "The NEMO P2P Service Orchestration Framework," 37th HICSS, Jan. 5-8, 2004, All pages.
Office Action dated Nov. 6, 2008 issued in related U.S. Appl. No. 11/583,646, filed Oct. 18, 2006.
Office Action dated Apr. 10, 2009 issued in related U.S. Appl. No. 11/583,646, filed Oct. 18, 2006.
Office Action dated Dec. 2, 2009 issued in related U.S. Appl. No. 11/583,646, filed Oct. 18, 2006.
Office Action dated Feb. 16, 2010 issued in related U.S. Appl. No. 11/583,622, filed Oct. 18, 2006.
Office Action dated Mar. 15, 2010 issued in related U.S. Appl. No. 11/583,695, filed Oct. 18, 2006.
Office Action dated Jul. 5, 2007 issued in related U.S. Appl. No. 11/583,527, filed Oct. 18, 2006.
Office Action dated Jan. 3, 2008 issued in related U.S. Appl. No. 11/583,527, filed Oct. 18, 2006.
Office Action dated Jun. 13, 2008 issued in related U.S. Appl. No. 11/583,527, filed Oct. 18, 2006.
Advisory Action dated Oct. 6, 2008 issued in related U.S. Appl. No. 11/583,527, filed Oct. 18, 2006.

(56) References Cited

OTHER PUBLICATIONS

Office Action dated Mar. 17, 2009 issued in related U.S. Appl. No. 11/583,527, filed Oct. 18, 2006.
Office Action dated Dec. 29, 2009 issued in related U.S. Appl. No. 11/583,527, filed Oct. 18, 2006.
Examination Report dated Feb. 19, 2010, for European Application No. EP09156631.5.
Office Action dated Jun. 24, 2010 issued in related U.S. Appl. No. 12/459,490, filed Jun. 30, 2009.
European Search Report and European Search Opinion completed Mar. 1, 2010, for European Application No. EP09156702.4.
European Search Report and European Search Opinion completed Feb. 24, 2010, for European Application No. EP09156727.1.
Office Action dated Jul. 7, 2010 issued in related U.S. Appl. No. 11/829,751, filed Jul. 27, 2007.
Office Action dated Jul. 8, 2010 issued in related U.S. Appl. No. 12/620,445, filed Nov. 17, 2009.
Office Action dated Jul. 14, 2010 issued in related U.S. Appl. No. 11/583,671, filed Oct. 18, 2006.
White, How Computers Work, Que Corp. Millennium Ed. 1999, All pages.
Smith et al., "Virtual Machines: Versatile Platforms for Systems and Processes," Elsevier Science, May 2005, All pages.
Office Action dated Jul. 20, 2010 issued in related U.S. Appl. No. 11/894,624, filed Aug. 20, 2007.
Interview Summary dated Jul. 20, 2010 issued in related U.S. Appl. No. 11/583,622, filed Oct. 18, 2006.
Office Action dated Jul. 20, 2010 issued in related U.S. Appl. No. 12/620,452, filed Nov. 17, 2009.
Office Action dated Jul. 20, 2010 issued in related U.S. Appl. No. 12/459,491, filed Jun. 30, 2009.
Office Action dated Jul. 22, 2010 issued in related U.S. Appl. No. 11/583,646, filed Oct. 18, 2006.
English language translation of Notice of Grounds for Rejection, dated Jul. 29, 2010 in related Korean Application No. 2010-7007909.
Office Action dated Aug. 3, 2010 issued in related U.S. Appl. No. 11/829,805, filed Jul. 27, 2007.
Office Action dated Apr. 14, 2010 issued in related U.S. Appl. No. 11/583,526, filed Oct. 18, 2006.
Office Action dated Aug. 19, 2010 issued in related U.S. Appl. No. 11/583,527, filed Oct. 18, 2006.
English translation of Notice of Grounds for Rejection dated Aug. 24, 2010 issued in related Korean Application No. 2005-7023383.
English translation of Notice of Reasons for Rejection dated Aug. 10, 2010 issued in related Japanese Patent Application No. 2006-509076.
English translation of Official Action dated Aug. 3, 2010 in related Eurasian Application No. 200901153.
Office Action dated Sep. 1, 2010 for U.S. Appl. No. 11/583,693, filed Oct. 18, 2006.
Yamato, "A Method of Service Composition Using Mobile Agent, Multimedia, Distributed, Cooperative and Mobile," (DICOMO 2003) Symposium, IPSJ, vol. 2003, No. 9, pp. 589-592, Jun. 4, 2003.
Examination Report dated Jul. 7, 2010, issued in related Canadian Application No. 2,528,428.
English translation of Office Action dated Aug. 20, 2010 for related Chinese Application No. 2006-80047769.2.
English translation of Office Action dated Jul. 15, 2010 for related Eurasian Application No. 2007-00510/31.
Office Action dated Sep. 21, 2010 issued in related U.S. Appl. No. 11/583,695, filed Oct. 18, 2006.
Office Action dated Oct. 6, 2010, issued in related U.S. Appl. No. 11/829,774, filed Jul. 27, 2007.
Office Action dated Oct. 7, 2010 issued in related U.S. Appl. No. 12/622,218, filed Nov. 19, 2009.
European Search Opinion dated Oct. 19, 2010 for related European Application No. 09156727.1.
European Search Opinion dated Oct. 19, 2010 for related European Application No. 09156702.4.
Office Action dated Oct. 27, 2010 issued in related U.S. Appl. No. 11/583,622, filed Oct. 18, 2006.
Office Action dated Nov. 16, 2010 issued in related U.S. Appl. No. 11/583,526, filed Oct. 18, 2006.
Office Action dated Dec. 7, 2010 issued in related U.S. Appl. No. 11/583,671, filed Oct. 18, 2006.
Office Action dated Dec. 21, 2010 issued in related U.S. Appl. No. 10/863,551, filed Jun. 7, 2004.
Office Action dated Jan. 18, 2011 issued in related U.S. Appl. No. 11/829,774, filed Jul. 27, 2007.
Office Action dated Jan. 19, 2011 issued in related U.S. Appl. No. 12/620,445, filed Nov. 17, 2009.
Advisory Action dated Feb. 11, 2011 issued in related U.S. Appl. No. 11/583,671, filed Oct. 18, 2006.
Advisory Action dated Feb. 17, 2011 issued in related U.S. Appl. No. 11/583,527, filed Oct. 18, 2006.
Office Action dated Mar. 8, 2011 issued in related U.S. Appl. No. 10/863,551, filed Jun. 7, 2004.
Office Action dated Mar. 15, 2011 issued in related U.S. Appl. No. 12/459,490, filed Jun. 30, 2009.
Office Action dated Mar. 15, 2011 issued in related U.S. Appl. No. 12/620,452, filed Nov. 17, 2009.
Office Action dated Mar. 24, 2011 issued in related U.S. Appl. No. 12/459,491, filed Jun. 30, 2009.
English translation of Conclusion on Invention dated Mar. 31, 2011 in related Eurasian Patent Application No. 2009011543.
Examination Report dated Apr. 13, 2011 issued in related European Application No. 06826285.6.
"IBM Cryptolope Live!," General Information Guide, Version 1, pp. 1-36 (1997).
Kaplan, "IBM Cryptolopes™, Super Distribution and Digital Rights Management," retrieved from internet on Mar. 14, 2000: URL:http://www.research.ibm.com/people/k/kaplan/cryptolope-docs/crypap.html (1996).
First Examination Report dated Apr. 4, 2011 issued in related Australian Application No. 2006-304655.
English translation of Notice of Reasons for Rejection dated Apr. 5, 2011 issued in related Japanese Patent Application No. 2007-320348.
Office Action dated Apr. 27, 2011 issued in related U.S. Appl. No. 12/622,218, filed Nov. 19, 2009.
Office Action dated May 23, 2011 issued in related U.S. Appl. No. 11/583,695, filed Oct. 18, 2006.
English translation of Decision on Rejection dated Apr. 25, 2011 in related Chinese Patent Application No. 200480021795.9.
Examination Report dated Apr. 11, 2011 issued in related Australian Patent Application No. 2010212301.
English translation of Notice of Reasons for Rejection dated Jun. 21, 2011 in related Japanese Patent Application No. 2008-536800.
Examiner Interview Summary dated Jul. 7, 2011 issued in related U.S. Appl. No. 12/622,218, filed Nov. 19, 2009.
Examination Report dated Jul. 13, 2011 issued in related European Application No. 04776350.3.
English translation of Decision of Final Rejection dated Jul. 12, 2011 in related Japanese Application No. 2006-509076.
Office Action dated Aug. 10, 2011, issued in related U.S. Appl. No. 10/863,551, filed Jun. 7, 2004.
Office Action dated Sep. 19, 2011, issued in related U.S. Appl. No. 11/583,527, filed Oct. 18, 2006.
English translation of Notice of Grounds for Rejection, dated Sep. 22, 2011, for Korean Application No. 2008-7011852.
Office Action dated Oct. 7, 2011, issued in related U.S. Appl. No. 11/804,667, filed May 17, 2007.
Office Action dated Oct. 17, 2011, issued in related U.S. Appl. No. 11/829,837, filed Jul. 27, 2007.
English translation of a Decision of Final Rejection dated Oct. 25, 2011 in related Japanese Patent Application No. 2007-320348.
Examiner's Answer dated Nov. 4, 2011 in related U.S. Appl. No. 11/583,693, filed Oct. 18, 2006.
Examiner's Answer dated Nov. 10, 2011 in related U.S. Appl. No. 11/583,671, filed Oct. 18, 2006.

(56) References Cited

OTHER PUBLICATIONS

Examiner's Answer dated Nov. 9, 2011 in related U.S. Appl. No. 11/583,646, filed Oct. 18, 2006.
Office Action dated Nov. 18, 2011 in related U.S. Appl. No. 12/789,004, filed May 27, 2010.
English translation of Decision of Final Rejection dated Nov. 22, 2011 in related Japanese Patent Application No. 2008-536800.
Office Action dated Dec. 13, 2011 in related U.S. Appl. No. 12/792,965, filed Jun. 3, 2010.
Office Action dated Dec. 21, 2011, in related U.S. Appl. No. 11/829,809, filed Jul. 27, 2007.
English translation of Notification No. 25, Official Action, dated Nov. 8, 2011 in related Israeli Patent Application No. 172366.
English translation of Notice of Granting, dated Nov. 28, 2011, in related Indonesian Patent Application No. W-00200801253.
Office Action dated Jan. 10, 2012 in related U.S. Appl. No. 12/792,952, filed Jun. 3, 2010.
Office Action dated Jan. 17, 2012 in related U.S. Appl. No. 11/583,695, filed Oct. 18, 2006.
Office Action dated Jan. 19, 2012 in related U.S. Appl. No. 12/617,164, filed Nov. 12, 2009.
English translation of First Office Action dated Dec. 7, 2011 issued in related Chinese Patent Application No. 201110009994X.
Examination Report dated Feb. 23, 2012 issued in related European Application No. 09156702.4.
English translation of Notice of Grounds for Rejection dated Feb. 17, 2012 in related Korean Patent Application No. 2011-7030396.
English translation of Conclusion on Patentability dated Jan. 26, 2012, issued in related Eurasian Patent Application No. 200901153/31.
English translation of Notice of Amendment dated Feb. 21, 2012 issued in related Chinese Patent Application No. 201110260513.2.
Office Action dated Mar. 14, 2012 in related U.S. Appl. No. 13/283,245, filed Oct. 27, 2011.
Examination Report dated Apr. 2, 2012 issued in related European Application No. 09156631.5.
English translation of Substantive Examination Report Stage I, issued in related Indonesian Patent Application No. W00 2007 01456, dated Mar. 6, 2012.
Notice of Acceptance dated Feb. 29, 2012 issued in related Australian Patent Application No. 2010212301.
Applicant-initiated Interview Summary dated Mar. 19, 2012 issued in related U.S. Appl. No. 11/583,527.
Applicant-initiated Interview Summary dated Apr. 9, 2012 issued in related U.S. Appl. No. 13/283,245.
Office Action dated May 3, 2012 in related U.S. Appl. No. 11/804,667, filed May 17, 2007.
Notice of Allowance dated May 11, 2012 in related U.S. Appl. No. 10/863,551, filed Jun. 7, 2004.
Office Action dated May 21, 2012 in related U.S. Appl. No. 12/617,164.
Office Action dated May 30, 2012 in related U.S. Appl. No. 11/829,837.
English translation of Preliminary Rejection (final notification) dated May 31, 2012 in related Korean Application No. 2008-7011852.
Final Office Action dated Jun. 15, 2012 in related U.S. Appl. No. 12/792,952.
Final Office Action dated Jun. 15, 2012 in related U.S. Appl. No. 12/789,004.
Office Action dated Jun. 25, 2012 in related Israeli Patent Application No. 190957.
Final Office Action dated Jul. 16, 2012 in related U.S. Appl. No. 12/792,965.
European Search Report dated Jul. 11, 2012 in related European Patent Application No. 10180088.6.
European Search Report dated Jul. 11, 2012 in related European Patent Application No. 10181095.0.
Final Office Action dated Jul. 23, 2012 in related U.S. Appl. No. 11/829,809.

English Translation of Notice of Grounds for Rejection dated Jul. 12, 2012 in related Korean Patent Application No. 2012-7015783.
Office Action dated Aug. 23, 2012 in related U.S. Appl. No. 13/283,245.
Office Action dated Oct. 4, 2012 in related U.S. Appl. No. 13/283,313.
Examination Report dated Sep. 11, 2012 in related Australian Patent Application No. 2012202810.
English Translation of Notice of Grounds for Rejection dated Oct. 26, 2012 in related Korean Patent Application No. 2011-7030396.
International Search Report and Written Opinion dated Oct. 23, 2012 in related PCT Application No. PCT/US2012/033150.
English translation of Second Office Action dated Oct. 9, 2012 in related Chinese Patent Application No. 201110009994.X.
English translation of Conclusion on Patentability dated Sep. 28, 2012, issued in related Eurasian Patent Application No. 200901153.
Search and Examination Report dated Oct. 10, 2012, issued in related ARIPO Patent Application No. AP/P/2008/004453.
Summons to Attend Oral Proceedings Pursuant to Rule 115(1) EPC dated Feb. 21, 2013 in related European Patent Application No. 06826285.6.
Wong, et al. "Dynamically Loaded Classes as Shared Libraries: an Approach to Improving Virtual Machine Scalability" Parallel and Distributed Processing Symposium, 2003. Proceedings International Apr. 22-26, 2003, pp. 38-47, cited in related European Patent Application No. 06826285.6.
Office Action dated Mar. 14, 2013 issued in related U.S. Appl. No. 13/283,126, filed Oct. 27, 2011.
Office Action dated Mar. 20, 2013 issued in related U.S. Appl. No. 11/829,837, filed Mar. 20, 2013.
Office Action dated May 7, 2013 issued in related U.S. Appl. No. 13/283,245, filed Oct. 27, 2011.
English translation of Notification No. 25, Official Action, dated May 9, 2013 in related Israeli Patent Application No. 223027.
Office Action dated May 28, 2013 issued in related U.S. Appl. No. 13/283,313, filed Oct. 27, 2011.
Office Action dated Jun. 11, 2013 issued in related U.S. Appl. No. 11/583,526, filed Oct. 18, 2006.
English translation of Notice of Reasons for Rejection dated Aug. 20, 2013 in related Japanese Patent Application No. 2011-248897.
English translation of First Office Action dated Jun. 6, 2013, issued in related Mexican Patent Application No. 2011/000735.
Office Action dated Oct. 4, 2013 in related Canadian Patent Application No. 2,626,244.
Office Action dated Oct. 21, 2013 issued in related U.S. Appl. No. 11/829,837, filed Jul. 27, 2007.
English translation of Third Office Action, dated Sep. 23, 2013 in related Chinese Patent Application No. 200480021795.9.
Office Action dated Nov. 14, 2013 issued in related U.S. Appl. No. 13/283,126, filed Oct. 27, 2011.
Notice of Allowance dated Nov. 21, 2013 in related U.S. Appl. No. 11/583,693.
Chang, et al.; "Multimedia Rights Management for the Multiple Devices of End-User"; Proceedings of the 23rd International Conference on Distributed Computing Systems Workshops; IEEE; 2003; pp. 1-6.
Jonker, W. et al.; "Digital Rights Management in Consumer Electronics Products"; IEEE Signal Processing Magazine; Mar. 2004; pp. 82-92.
Simon, J. et al.; "A Digital Licensing Model for the Exchange of Learning Objects in a Federated Environment"; Proceedings of the First International Workshop on Electronic Contracting; 2004; pp. 1-8.
Tari, Z. et al.; "Controlling Aggregation in Distributed Object Systems: A Graph-Based Approach"; IEEE Transactions on Parallel and Distributed Systems; vol. 12, No. 12; Dec. 2001; pp. 1236-1256.
Office Action dated Dec. 3, 2013 issued in related U.S. Appl. No. 13/444,624, filed Apr. 11, 2012.
Office Action dated Dec. 11, 2013 issued in related U.S. Appl. No. 11/583,526, filed Oct. 18, 2006.
Office Action dated Dec. 20, 2013 issued in related U.S. Appl. No. 12/789,004, filed May 27, 2010.

(56) References Cited

OTHER PUBLICATIONS

English translation of TW Search Report and Office Action dated Jan. 21, 2014 in related Taiwan Application No. 095138235.
Indian Examination Report dated Jan. 31, 2014 in related Indian Application No. 2720/KOLNP/2008.
Office Action dated Feb. 20, 2014 issued in related U.S. Appl. No. 11/583,622, filed Oct. 18, 2006.
Office Action dated Mar. 13, 2014 issued in related U.S. Appl. No. 12/792,965, filed Jun. 3, 2010.
Office Action dated Mar. 20, 2014 issued in related U.S. Appl. No. 12/459,490, filed Jun. 30, 2009.
Office Action dated Mar. 24, 2014 issued in related U.S. Appl. No. 11/894,624, filed Aug. 20, 2007.
Office Action dated Apr. 1, 2014 issued in related U.S. Appl. No. 11/829,805, filed Jul. 27, 2007.
English translation of JP Final Rejection dated Mar. 25, 2014 in related Japanese Application 2011-248897.
Office Action dated May 6, 2014 issued in related U.S. Appl. No. 11/583,527, filed Oct. 18, 2006.
Australian Office Action dated May 19, 2014 in related Australian Application No. 2012242895.
Office Action dated May 21, 2014 issued in related U.S. Appl. No. 12/620,445, filed Nov. 17, 2009.
Office Action dated May 20, 2014 issued in related U.S. Appl. No. 12/459,491, filed Jun. 30, 2009.
Office Action dated May 23, 2014 issued in related U.S. Appl. No. 12/789,004, filed May 27, 2010.
Office Action dated May 29, 2014 issued in related U.S. Appl. No. 11/829,751, filed Jul. 27, 2007.
Examination Report dated Jun. 11, 2014 issued in related European Application No. 10180088.6.
Examination Report dated Jun. 11, 2014 issued in related European Application No. 10181095.0.
Office Action dated Jun. 12, 2014 in related Canadian Patent Application No. 2,626,244.
Office Action dated Jun. 25, 2014 issued in related U.S. Appl. No. 12/622,218, filed Nov. 19, 2009.
English translation of JP First Office Action dated Jun. 24, 2014 in related Japanese Application 2014-030471.
English translation of Fourth Office Action, dated May 21, 2014 in related Chinese Patent Application No. 200480021795.9.
Office Action dated Jun. 27, 2014 in related Canadian Patent Application No. 2,776,354.
Office Action dated Aug. 8, 2014 issued in related U.S. Appl. No. 11/583,622, filed Oct. 18, 2006.
Extended European Search Report dated Aug. 25, 2014 in related EP Application No. 12770687.7.
Office Action dated Sep. 11, 2014 issued in related U.S. Appl. No. 12/620,452, filed Nov. 17, 2009.
Office Action dated Sep. 17, 2014 issued in related U.S. Appl. No. 11/829,774, filed Jul. 27, 2007.
Office Action dated Sep. 17, 2014 issued in related U.S. Appl. No. 12/459,490, filed Jun. 30, 2009.
Office Action dated Sep. 26, 2014 issued in related U.S. Appl. No. 11/804,667, filed May 17, 2007.
Office Action dated Sep. 26, 2014 issued in related U.S. Appl. No. 12/792,952, filed Jun. 3, 2010.
Office Action dated Sep. 26, 2014 issued in related U.S. Appl. No. 12/617,164, filed Nov. 12, 2009.
Office Action dated Sep. 26, 2014 issued in related U.S. Appl. No. 11/829,809, filed Jul. 27, 2007.
English translation of First Office Action, dated Aug. 5, 2014 in related Chinese Patent Application No. 201210218731.4.
Indian Examination Report dated Sep. 10, 2014 in related Indian Application No. 1969/KOLNP/2008.
Office Action dated Nov. 7, 2014 issued in related U.S. Appl. No. 11/894,624, filed Aug. 20, 2007.
Office Action dated Nov. 12, 2014 issued in related U.S. Appl. No. 11/583,527, filed Oct. 18, 2006.
English translation of JP Final Rejection dated Nov. 11, 2014 in related Japanese Application 2014-030471.
English translation of Fifth Office Action, dated Nov. 24, 2014 in related Chinese Patent Application 200480021795.9.
Office Action dated Jan. 9, 2015 issued in related U.S. Appl. No. 13/444,624, filed Apr. 11, 2012.
Office Action dated Jan. 26, 2015 issued in related U.S. Appl. No. 12/622,218, filed Nov. 19, 2009.
Office Action dated Feb. 10, 2015 issued in related U.S. Appl. No. 13/283,126, filed Oct. 27, 2011.
English translation and First Office Action, dated Dec. 31, 2014 in related Chinese Patent Application 201110260513.2.
Office Action dated Mar. 10, 2015 issued in related U.S. Appl. No. 11/583,622, filed Oct. 18, 2006.
Office Action dated Mar. 31, 2015 issued in related application U.S. Appl. No. 11/583,527, filed Oct. 18, 2006.
Office Action dated Jun. 2, 2015 issued in related U.S. Appl. No. 13/283,245, filed Oct. 27, 2011.
Office Action dated Jun. 11, 2015 issued in related U.S. Appl. No. 13/444,624, filed Apr. 11, 2012.
Canadian Office Action dated Jul. 7, 2015 in related CA Application No. 2,626,244.
English translation and First Office Action, dated Aug. 5, 2015 in related Chinese Patent Application 201280028593.1.
Office Action dated Sep. 24, 2015 issued in related U.S. Appl. No. 11/583,526, filed Oct. 18, 2006.
Office Action dated Oct. 1, 2015 issued in related U.S. Appl. No. 12/789,004, filed May 27, 2010.
Office Action dated Oct. 6, 2015 issued in related U.S. Appl. No. 11/829,837, filed Jul. 27, 2007.
Office Action dated Mar. 18, 2016 issued in related U.S. Appl. No. 13/444,624, filed Apr. 11, 2012.
English translation and Second Office Action, dated Feb. 26, 2016 in related Chinese Patent Application 201280028593.1.
English translation and First JP Office Action dated Apr. 26, 2016 in related Japanese Application 2014-505260.
English translation of Brazilian Office Action dated Apr. 19, 2016 in related Brazilian Application PI0410999-6.
Notice of Allowance dated Dec. 14, 2016 issued in related U.S. Appl. No. 11/583,527 filed Oct. 18, 2006.
Notice of Allowance dated Oct. 24, 2016 in related U.S. Appl. No. 13/444,624, filed Apr. 11, 2012.
Office Action dated Oct. 6, 2017 issued in related U.S. Appl. No. 15/048,532, filed Feb. 19, 2016.

* cited by examiner

INFORMATION SECURITY SYSTEMS AND METHODS

CROSS REFERENCE TO RELATED APPLICATIONS

This application is a continuation of U.S. patent application Ser. No. 13/444,624 filed Apr. 11, 2012, which claims the benefit of priority of Provisional Application No. 61/474,212, filed Apr. 11, 2011, both of which are hereby incorporated by reference in their entireties.

Systems and methods are presented for facilitating the secure, persistent governance of information content. It will be appreciated that these systems and methods are novel, as are many of the components, systems, and methods employed therein.

BRIEF DESCRIPTION OF THE DRAWINGS

The inventive body of work will be readily understood by referring to the following detailed description, in conjunction with the accompanying drawings, in which.

DETAILED DESCRIPTION

Figure 1A:
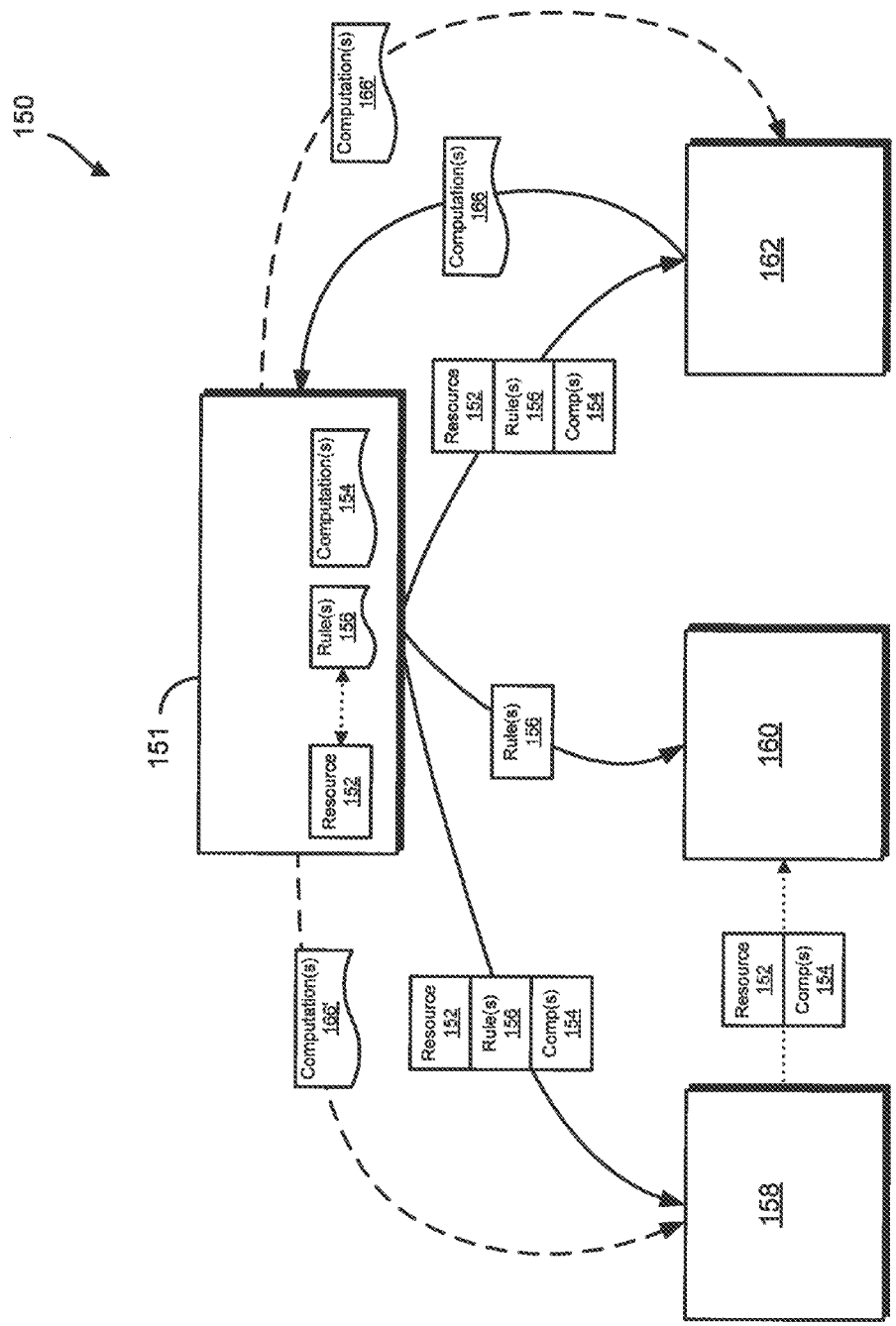
FIG. 1A shows an illustrative system for distributing derived resources.

A detailed description of the inventive body of work is provided below. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body work.

Systems and methods are presented for facilitating the secure, persistent governance of information content. It will be appreciated that these systems and methods are novel, as are many of the components, systems, and methods employed therein.

Digital rights management ("DRM") systems typically use cryptography to persistently associate a resource with a set of rules for governing access to that resource. In many cases, the resource to be protected is a piece of digital content, such as an electronic book, an audiovisual stream, or a video game. In order to access the resource, the user may need to indicate the action to be performed, which then triggers an evaluation of rules governing the resource for that particular action. If the action is allowed under the rules, the DRM system provides access to the resource, as it was originally packaged. This type of resource can be thought of as "static", since it is presented to a user in the form in which it was originally packaged (although decoding, decompression, or other computations that are effectively implicit in the use of the resource may first need to be applied).

Some DRM systems are able to select a portion of a resource for access. For example, a DRM-enabled video player may provide access to a single video track even though multiple tracks are encoded in one file. The rules evaluation engine typically allows the user to specify which subset of the resource is to be accessed. There has also been some effort to provide different views of a packaged resource depending on business model. For example it is possible to integrate a DRM system with the MPEG-4 SVC encoding scheme to allow lower- or higher-resolution access to a video depending on the price paid for access to the video. In both of these cases, however, the resource and all of its possible variants are pre-computed and digitally signed so that they cannot be modified.

Static resources (or portions thereof) are presented to the user exactly as they were encoded by a packager. In contrast, a derived resource is a resource that is computed from an original resource by a computation (typically, but not necessarily, performed at the point of consumption) before presentation to the user.

In a preferred embodiment, the computations that produce derived resources are expressed as computer-readable instructions for operating on an original resource to produce a particular view of the original resource. Although, in some embodiments, the computations may involve the use of mathematical calculations, the term "computation," as used herein, is not so limited, and encompasses any set of instructions, procedures, methods, or other mechanisms for producing a particular presentation of the original resource (e.g., one that does not disclose all of the information in the original resource). For example, if the original resource were a list of "name-birthdate-height" triplets, an example of a computation would be any suitable way of instructing a rendering application to display only a list of "birthdate-height" pairs (i.e., to omit the "name" data from the display). Another example of a computation would be a set of instructions that would operate on the original data set to generate the median height and the average height for display.

Computations may be specified in a variety of ways, examples of which include, without limitation, some or all of the following:

They may be associated at the time of packaging by the original packager (the entity that first encrypts the resource).

They may be produced after packaging, and securely associated with the resource. These post facto computations can be created by the packager of the data or, in some embodiments, by a third party who would like a computation to run over a protected resource.

In some embodiments, a resource may be protected without any associated computations. In some embodiments, the DRM system could be designed to access derived resources (e.g., resources packaged and/or otherwise identified as such) only in accordance with their associated computations. In such embodiments, if there were no computations associated with a resource, access would effectively be prevented. In other embodiments, a resource could, by default, be accessible unless prohibited by associated rules. In such embodiments, if there were no computations associated with the a resource, the resource would be accessible (in accordance with any associated rules) unless a rule associated with the resource required possession of one or more computations in order to authorize access to the resource.

Derived resources are particularly useful in cases in which access to the resource should depend upon factors such as, for example, the principal that will perform the action, environmental considerations at the point of rules evaluation (e.g. computational capabilities), state variables managed by the DRM system (e.g. the status of a payment), the amount of information that has already been revealed about the resource, and/or the like. In these cases, the objective is typically to provide access to a derivative of the original resource, possibly based on context at the point of evaluation.

Derived resources can have several properties that make them particularly useful in comparison to static resources. Such properties may include some or all of the following:

Late Binding

The precise view required of a raw resource need not be computed in advance; the packager can associate a computation that produces the derived resource. If a new type of computed resource becomes important, the packager of the data can simply provide a new set of rules and computations rather than re-computing, repackaging, and retransmitting the entire original resource (which may be a large data set).

For example, suppose that the original resource is a human genome sequence. The resource can be encrypted and packaged with several computations that reveal certain limited information about the genome—is the subject male or female? Does the subject have a certain mutation in the BRCA2 gene? etc. At a later date, the owner of the data determines that it is important to provide access to a new aspect of the sequence, such as the number of copies of the CCL3 gene, which is related to the risk of HIV. The packager creates a new computation, associates it with the original resource, and distributes it to interested parties. It is not necessary for the packager to either know about this computation in advance, or to provide unlimited access to the data.

Third Party Computations

Computations can be proposed by users of the packaged information and then securely associated with the resource by, e.g., the original packager and/or another entity with the right to do so.

Continuing with the human genome sequence example, suppose the sequence is encrypted and sent to a researcher who wishes to incorporate information about the sequence into his study. As part of the original package, the researcher receives a set of computations that provide various views of the data. The researcher has discovered a new algorithm that combines information from several genes in order to estimate the risk of a particular disease, but he cannot obtain all of the information he needs using the computations that have been provided by the owner of the data. The researcher creates a computation that, when run against the sequence, will produce his estimate. He sends this computation to the owner. Assuming that the owner agrees, the new computation is securely associated with the resource and sent back to the researcher in a form that allows him to run the computation against the sequence.

A similar example would be a computation created by a pharmaceutical company to estimate the appropriate dosing of a particular drug by analyzing the genome sequence. This type of dosing sensitivity analysis is often carried out for prescribing the anti-coagulant, warfarin. Patients with particular variants in the CYP2C9 and VKORC1 genes may be more or less sensitive to this drug. With a derived resource, it is possible to run this sensitivity test on a genome sequence that has been previously stored and protected (e.g. at birth) without additional wet-lab work.

Composition of Computations

When determining that a third-party computation ought to be bound to a resource, the packager may wish to allow the computation to proceed, but add his own pre- or post-conditions to the flow of computation that produces the derived resource.

For example, suppose that the governed resource is the map of a given (large) region, along with address information. A third party proposes a computation that, given an address, returns the spatial coordinates associated with the address. The packager may be willing to accept this computation, in general, but he does not wish to disclose the exact coordinates. Instead, he would prefer that the computation return only the city, or neighborhood, etc. The owner/packager then creates a second computation that consumes the output of the computation proposed by the third party and modifies it to obscure the more detailed information. When he binds the third-party computation to the resource, he requires that his own second computation be applied before the output can be returned to the requester.

In some embodiments, a computation could be associated with a resource that formulates and sends an audit record containing information about when, by whom, and in what circumstances the resource was derived.

FIG. 1A shows an example system 150 for governing a digital resource 152 in accordance with some embodiments. As shown in FIG. 1A, the digital resource 152 (e.g., scientific research data, healthcare records, genetic information, media content, and/or the like) is packaged together with a set of computation(s) 154 and rule(s) 156 by a first entity 151 (e.g., an owner or distributor of the digital resource 152, or an entity acting on behalf thereof). For example, the resource 152 may be encrypted, digitally signed, and/or otherwise protected, and securely associated with the computation(s) 154 and rule(s) 156. Resource 152 may be distributed together with computation(s) 154 and/or rule(s) 156 to a remote entity 158 via any suitable communications medium (e.g., a computer network such as the Internet, a mobile communications network, etc.). Alternatively, or in addition, resource 152 may be distributed to a remote entity 160 independently of computation(s) 154 and/or rule(s) 156. Another entity 162 may propose additional computations 166 pertaining to resource 152 to the first entity 151. The first entity may securely associate computations 166 with resource 152 (e.g., in the form proposed by entity 162, or in modified form, or with additional pre- or post-computations required to be performed with computations 166, or the like), and distribute (or make available for distribution) such computations 166' for use in connection with resource 152.

Privacy-Preserving Computations

As in the examples described above, derived resources can be used to help preserve the privacy of the original data. In some embodiments, several factors may help to determine the types of computations that may be bound to a resource. For example, the known history of the computations that have been bound to the resource may be analyzed to ensure that only a desired amount of disclosure occurs. For example, the packager may have issued computations that, when used together, might otherwise reveal more information than intended. Therefore, for example, the packager may decide to progressively decrease the resolution of the data revealed by successive computations. For this purpose, the packager may also wish to take into account audit records that were required upon execution of various computations on the resource.

In some embodiments, computations can be randomized at least in part to protect privacy/secrecy of the data. For example, a computation can be anonymized by adding random noise to the resource before output. Although an adversary may perform the computation multiple times and evaluate the statistics (e.g. the average value) of the derived resources returned, in some embodiments the packager can mitigate against this attack by, for example, limiting the number of such requests, changing the statistics as more and more requests are made, remembering a state variable (such as a random number seed) so that the same principal gets the same randomized data upon each application of the computation (thereby preventing the statistical attack), and/or the like.

Different Views for Different Principals

In some embodiments, computations may depend on conditions such as the principal accessing the information. In such embodiments, different stakeholders in the packaged resource may obtain different views; different computations may be associated with different principals. This capability interacts with the ability to specify particular principals in the rules to gate overall access to the resource; that set of rules can dictate whether a given principal has the opportunity to access the resource at all, and so it determines whether a derived resource is ever computed. If it does run, however, the computation may decide to produce a different derivation depending on the principal making the request, or attributes of the principal (e.g. membership in a given class).

Using this technique, for example, one could construct a protected health record that can be accessed by all doctors in a hospital, but which includes additional detail when accessed by a patient's primary physician. The derived resources approach allows the governed resource to remain a single package as opposed to requiring multiple packages for different principals.

Different Views in Different Contexts

Just as, in some embodiments, the view of a resource may depend on the principal requesting access to the resource, so may the view depend upon other contextual information that exists at the point where the computation is performed.

For example, the set of rules governing a piece of content might allow access to any device that is registered to a given user, but the computations may output the resource at a given resolution for a particular type of device. Or, only a specific excerpt may be shown on a particular type of device, whereas the full resolution is available on other device types.

Preserving Data Fidelity

Although a number of examples have been given in which, e.g., to preserve privacy, the accuracy or fidelity of the data presented to a user is reduced, it will be appreciated that in some embodiments the computations that produce derived resources are not necessarily lossy; that is, they need not remove any of the original information in the process of producing the derived resources. Using derived resources, the original data need not be repeatedly filtered and repackaged, so no information is lost that may be of use in the future.

For example, suppose that the resource is a series of activity levels (as recorded by an accelerometer) for a given patient. In general, a physical therapist might only be interested in the average daily activity level, so the resource may come with a set of computations that produce these averages. One approach to providing those averages would be to take the original resource, perform the averages, and then protect the sequence of averages as a separate resource. However, this approach does not provide the ability to go back into the high-resolution data to determine, for example, the intensity of a given exercise session. If, instead, the averages are performed in accordance with a preferred embodiment of the derived resource approach, new computations can provide information that could not have been obtained from the filtered, repackaged activity data, since the original, raw data would still be available for use by such new computations.

Auditability

In some embodiments, the computations performed as a condition for rendering can be expressed for a standardized machine so that the original packager of the resource can validate and rely upon the results of specified computations, or they can be expressed declaratively using previously agreed semantics.

In some embodiments, when a packager associates a computation with a resource, the computation is first validated (especially if it was generated by a third party). In general, automatic validation of the functionality of a computation is difficult, and the more expressive the computational framework, the more difficult. Therefore packagers may rely upon various heuristic methods, such as inspecting the metadata that describe the computation, running the computation in a test environment before approving it, verifying that the proposed computation was signed by a trusted third party, authenticating the identity of the proposer, and/or the like. A uniform computational framework—e.g. a specific language in which the computations are expressed—helps packagers to validate proposed computations.

Computations Governing Multiple Sub-resources

One type of resource that may be governed with the derived resources approach may be an entire database of sub-resources, with the database protected by one or more keys. In this formulation, running computations against the resource is similar to querying the database. The packager may restrict the kinds of queries that may be performed on the resource by constraining the computations.

For example, suppose that the governed resource is a set of full genetic sequences and health records of a particular population. Associated computations allow users to query the resource to determine, for example, how many of the females in the population express the BRCA1 gene. Or how many females between the ages of 18 and 45 code for this gene. In this example, the combination of the data resource and the computations that operate on it allows users to explore the data. In this example, the types of computations that may be performed on the data set might be defined by the original packager; the packager may add further computations as necessary in the future. For example, if a certain correlation is postulated, the packager may provide a set of computations that allow other users to explore that correlation in the original data set. With static resources, the data would have been reduced before packaging, and information would be lost. With derived resources, the full data set can be preserved, with additional access given in the future as needed.

Delegation of Computational Binding

In some embodiments, the originator or creator of a resource is not necessarily required to perform all binding between the resource and computations. For example, the originator may delegate the binding of computations to a third party, such as a database designed to manage a set of resources as a single logical resource.

For example, a genetic sequencing machine may establish a trusted channel with an online server and upload sequence information to it, delegating to the service the ability to determine which kinds of computations may be run on the sequence in the future.

Returning a Derived Resource

In some embodiments, a derived resource may be returned as a result of a running a computation on another derived resource.

For example, an original resource might comprise a governed set of sub-resources. When an associated computation is performed on the resource to extract information about a particular sub-resource, that computation may result in the production of a second derived resource comprising the sub-resource and a set of computations for interrogating that sub-resource.

Location of the Computation

Figure 1B:
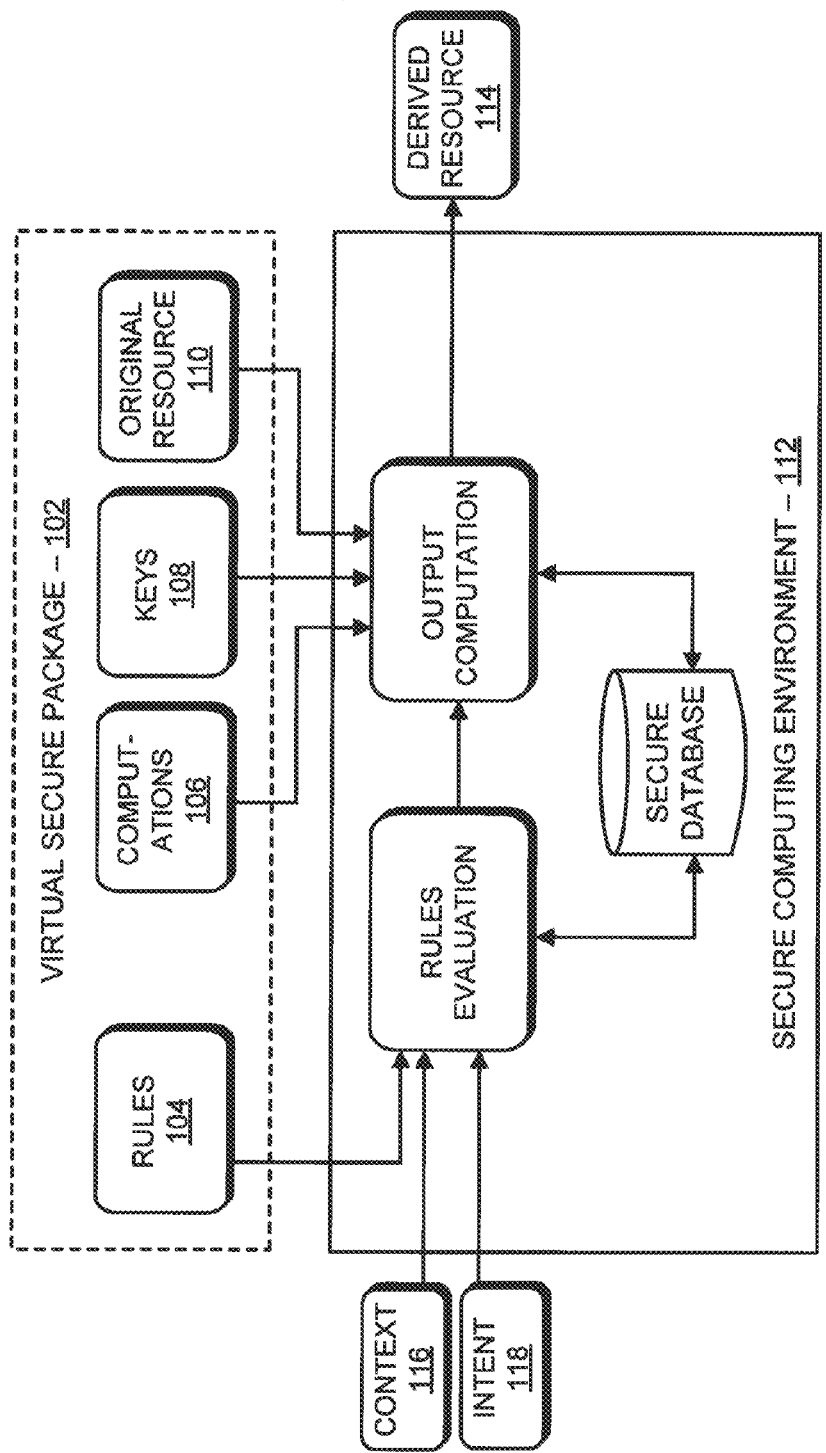
FIG. 1B shows an illustrative system for providing access to derived resources.

In a preferred embodiment, computations associated with a governed resource are performed in a protected processing environment. In some embodiments there is no logical restriction on the location of this protected processing environment. In some embodiments, the owner/packager of the resource sends a virtual secure package out into the world for various consuming entities to process; the computations (as well as rules evaluation) happen in protected processing environments at the consumer sites. An example of such a scenario is shown in FIG. 1B, which shows an illustrative system that governs derived resources in accordance with one embodiment of the inventive body of work. As shown in FIG. 1B, a virtual secure package 102 includes rules 104, computations 106, keys 108, and an original resource 110. The virtual secure package 102 is processed in accordance with its rules by a secure computing environment 112 to yield a derived resource 114. The dashed line around the virtual secure package 102 shown in FIG. 1B is meant to indicate that the four subcomponents shown (104, 106, 108, and 110) may be distributed together or separately, but are persistently associated with one another using, e.g., cryptographic techniques. The context information 116 shown in FIG. 1B may include, for example, information from the environment in which the resource derivation is being performed, which may include, for example, information gathered from the user of the system. The intent information 118 shown in FIG. 1B may, for example, specify the use that the user wishes to make of the data, and can be used to determine, at least in part, which rules 104 and computations 106 should be evaluated.

It will be appreciated that FIG. 1B is presented for purposes of illustration, and that there are many other viable possibilities. For example, the owner/packager of the resource may perform some or all of the computations in its own protected processing environment, and return results to a requester, e.g., based on certain attributes of the requester, such as an authenticated identity. Alternatively (or in addition), the computations on a resource may be performed by a delegate to whom the resource originator has delegated authority to attach or perform these computations.

Computing Against a Remote Resource

Figure 2:
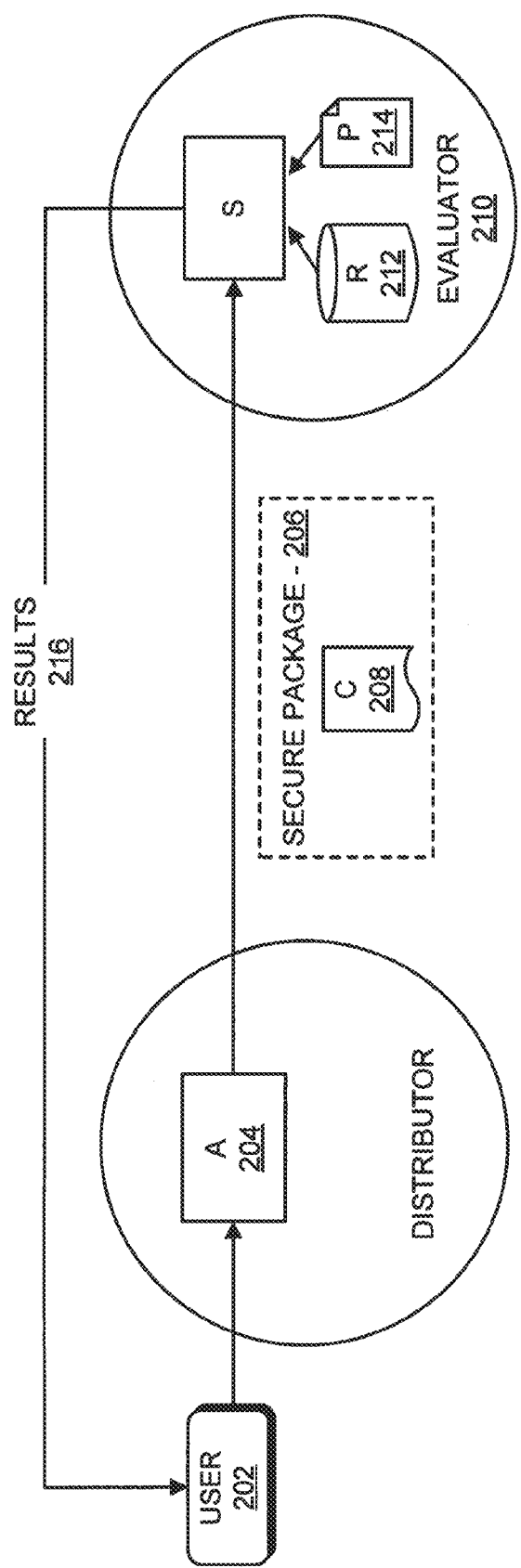
FIG. 2 shows an example of a computation being run against a resource in accordance with one embodiment.

By combining the third-party computation technique described above with the techniques described regarding location of computation, it becomes possible to propose a computation to run against a remote resource. In one such embodiment, the owner of the resource could determine the necessary steps for authenticating and validating the proposed computation, and then perform the computation against his own resource, returning the result to the requester. One example of such a configuration is illustrated in FIG. 2.

In some embodiments, the logical binding between a computation and the resource may happen in one or more ways, including, for example:

By Name—the computation comes with metadata that specifies the resource(s) on which it is to be run.

By Attribute—the computation is sent along with a set of attributes that must be true of the resource to be operated on. For example, the requester may send a query string that the recipient uses to determine the set of resources over which the computation should be run.

FIG. 2 shows an example of how a computation can be proposed to run against a resource. A user 202 makes a request concerning a resource and is authenticated by authenticator A 204. A secure package 206 including the computation 208 is sent to the evaluator system 210, where it is verified and authenticated by the evaluator 210 and run against resource R 212 with policy P 214. The results 216 are returned back to the user 202, possibly through a series of intermediaries.

It will be appreciated that the systems and methods described herein can be applied to virtually any type of content, some non-limiting examples of which are included below.

Examples of Derived Resources

Scalable Video—In some embodiments, the SVC ("Scalable Video Coding") media example described above—in which access to varying levels of pre-computed resolution are granted based on the amount paid—can be replaced by a combination of a single, high-resolution video resource and a set of computations, each of which is governed by a rule of its own. For example, a user might have access to a low-resolution version of the video provided that certain conditions are met and that the resource is first filtered by a specified computation. Each level of resolution could be associated with a specific computation that produces the appropriate signal for rendering.

Filtered Health Data—In some embodiments, given a data series that consists of a sequence of health-related measurements (e.g., pulse rate measured every second for the last few months), different principals may be given access to different data resolutions. The patient himself might have access to the entire data series in full resolution, while his doctor may have access to a coarser view—the average resting and active pulse for the trailing two weeks. The doctor in this case may still have access to personally identifiable information, whereas a completely unrelated third party (such as an epidemiologist or researcher) may have access only to fully or partially anonymized data. The computations that perform the de-resolution of the data can be packaged along with the original data resource. In this case, the rules governing access to the data series could be associated with different principals or roles.

Virtual Worlds—In some embodiments, the original resource could be a game that consists of a description of a virtual space, encoded in enough detail that a sufficiently powerful rendering engine can produce a three-dimensional, interactive model of the space. For example, one area of the virtual space might be available only to users that have achieved a certain level in the game. The rules governing the resource perform the computations of the views, or computations that are essential for producing the views.

Universal Decoding—In some embodiments, the original resource might consist of an interactive audiovisual presentation encoded in a particular proprietary format. The computation associated with rendering the resource could contain a full decoder for the data that decodes the original resource in a way that allows it to be rendered on the target platform.

Governance of Genetic Information—In some embodiments, the governed resource could be, e.g., a set of full genetic sequences and health metrics of a particular population, e.g., as described above.

Scientific Research—In scientific research it is often important to make data maximally available and verifiable while still ensuring that it is protected. Reputable scientific publications would typically like to ensure that the data driving the conclusions in published research is available to other scientists so that it may be verified. The algorithms used to process that data should also be available for peer review. At the same time, the data should not be susceptible to tampering. Thus, in some embodiments the data can be published in a protected form, with a rule specifying particular computations that may be performed on the data set. This arrangement simultaneously meets the needs of openness/publication and integrity protection.

Negotiating Advertising Load—In another example, a media (e.g., video or audio) stream might be partially funded by advertising. In this example, the resource might comprise a main program and a set of advertisements that may be inserted into the main program stream at certain positions. The derived resource returned when the resource is accessed may, for example, include a certain number of these advertisements based on, e.g., the principal requesting the content resource, attributes of that principal, and/or context at the point of rendering. For example, if the principal has already viewed a given set of advertisements in a given program, the computation may substitute in an alternate set. If the viewer has paid for a subscription, the computation may eliminate the advertisements altogether.

Negotiating Coupon Value—Another example is a variant on the advertising example described above; however, the resource returned in this example is not a media stream, but a digital coupon. The face value of the coupon can be determined by the interactions between the computation and the user. The user gets a better redemption value on the coupon if the user is willing to watch an advertisement that is included as part of the original resource.

As previously indicated in connection with FIG. 1B, in some embodiments, the elements of a virtual secure package 102 are bound together. As shown in FIG. 1B, these elements might include the original resource 110, one or more keys 108 that are used to encrypt and/or decrypt the resource, a set of one or more computations 106 that produce derived resources based on the original, and a set of one or more rules 104 that govern access to the original and/or derived resources.

In some embodiments, the binding may comprise packaging these elements together in a single package, but it may also comprise applying cryptographic (or other computational) techniques to associate these elements even when they are distributed separately. A number of factors may be used by the packager to determine whether computations should be bound to a resource. These may include, for example, authentication of the party that created the computation, attributes of that party (e.g. membership in a trusted group), inspection of metadata associated with the computation, results of running the computation in a test environment, etc.

In some embodiments, the computations may be bound with different strengths, as described below.

Strong Binding

In a strong binding example, computations, rules, resources, and keys are cryptographically bound together into a virtual secure package. One mechanism that may be used to bind a computation to a resource is to include the computation in the same package as the rules that gate overall access to the resource. The user may choose which of these rules to evaluate, and if the conditions are met, the associated computations are applied to the resource before it is returned. It will be appreciated that any suitable mechanism can be used to bind rules to a resource. For example, in some embodiments, the binding techniques described in commonly assigned, co-pending U.S. patent application Ser. No. 11/583,693 (Publication No. 2007/0180519 A1), filed Oct. 18, 2006 ("the '693 application") may be used.

In some embodiments, binding can be accomplished using a separate binding object that securely associates a computation with a resource. That binding object may contain some information that uniquely identifies the resource being bound, such as, for example, a hash of the resource, the resource ID, a reference to the key that encrypts the resource, and/or the like. The binding object may also contain either the computation itself, or a reference to the computation, such as a hash of the computational program, a unique identifier, etc. The binding object may itself be signed to provide for integrity protection of the binding and to authenticate the party that created the binding at the point of evaluation.

Using this approach, the computations may travel separately from the rules, the resource, and the keys, but remain logically within the secure virtual package. In some embodiments, computations may be chained (composed) through the use of binding objects that point to other binding objects to be used as pre- or post-computations. Also, with the binding object approach, it is not necessary to create the associations between resources and computations a priori—computations can be bound at a later time, and in some embodiments they can be proposed by other parties.

Weak Binding

In some embodiments, a relatively weak binding can be used instead, e.g., based on identifying a computation by name or attribute rather than using cryptography.

As shown in FIG. 1B, in a preferred embodiment a secure computing environment is used to evaluate rules and apply computations on the original resource. In some embodiments, the secure computing environment has some or all of the following properties:

It validates the source of the elements in the secure package as trustworthy in some embodiments it has the ability to discriminate between virtual secure packages that are from known or trusted sources and those that are not, and, in the latter case, the secure computing environment is able to avoid evaluating rules or performing resource derivations.

It prevents tampering or interferences with the evaluation of rules or resource derivation computations at the point of access to the content.

It protects the keys used to encrypt the content from unauthorized access.

In some embodiments, a well-defined computational engine is used to produce the derived resources. Embodiments of this computation engine can be designed depending on the manner in which the computations are expressed. For example:

Declarative computations—Computations may be expressed declaratively, using documents written in a special-purpose language that indicate the computations that need to be performed upon the original resource but not giving guidance as to how these computations are to be effected. In such cases, the computation engine should understand the semantics of the special-purpose language with which the computations are specified so that the original creator of the virtual secure package can be assured that the computations are performed in an expected manner. The packagers and users will typically agree on the declarative language in advance.

Procedural computations—Computations may also be expressed as programs written for a standardized machine. In particular, the system design may specify a virtual machine language in which these computations are expressed. Because the original creator of the computations knows the specification for the standardized machine, he can create procedural computations with a full understanding of its operation, without being required to specify in advance the high-level semantics of the computations being performed.

In some embodiments an optional protected database may also be used, e.g., at the point of rules evaluation, to store state variables that are used as inputs to, or to otherwise affect, the computations.

EXAMPLES

Some additional examples of the implementation and use of derived resources in accordance with embodiments of the inventive body of work are presented below. Although many of the examples relate to biology and epidemiology, it will be appreciated that the inventive body of work is not limited to these fields.

Preserving Privacy in Large Surveys

In this example a national survey is trying to determine the link between a certain type of illness, profession, and home address. The purpose of the survey is to produce a map with high medium and low risk for different types of the illness. The map is incorporated in a zooming system so the viewer of the map can zoom from a global view to a local view. A query interface allows the viewer to ask for display of different types of conditions and professions.

The survey combines the results from many different databases in a secure environment and packages the result as a governed derived resource.

In this example, the rules for querying the results inside the governed derived resource might be as follows:

When the result of the query is over a large area, the results will be specific, for instance, the number of teachers with the illness in a particular state will be reported to an accuracy on the order of 10 if there are more than 100 results returned. If there are less than 100 results returned the reported value will be a random value with a normal around 50 and a deviation of 10.

For progressively smaller areas, the accuracy of the results will degrade so that you can never get better accuracy than on the order of 30 results.

Random results will be inserted into the return values to make certain that individuals can't be identified by narrowing the selection in the survey; however, if the requester can provide credentials that identifies him or her as a licensed physician in the state where the data view is requested, all results are accurate down to an order of two.

The resulting governed derived resource can be downloaded from the survey center and viewed on any computer with a secure computing environment.

This allows the casual observer to view the effects, if any, between location and diagnosed cases of the illness, without being able to identify the actual individuals with the condition. Licensed physicians in the state can get a much more accurate view.

To implement this example, the person performing the survey might query a number of databases for relevant data and creates a new database from these results. The database could be implemented as a file. Two different sets of accessor functions to the database could be implemented as computer programs. The programs could reside in program files stored in memory of a computer system.

The program pertaining to the licensed physicians could be encrypted with the public keys of the recognized state certifying boards. One way to do this is to create a symmetric key, encrypt the program with this key, then encrypt the symmetric key with the public keys of the state certifying boards.

The database file, the accessor program files pertaining to the public, and the encrypted program pertaining to licensed physicians could all be packaged into a transport file. This file could be encrypted with the public keys of the common secure computing environment providers and distributed to anyone who wants to view the survey.

When a user wants to view the survey via a viewer, he or she first presents credentials. The credentials can either be the standard credentials that come with the secure computing environment, or credentials from an authority that, e.g., can assert that the user is a qualified licensed physician.

At a later time, after the survey has been published, a doctor notices a connection between a specific gene ABC1, an environmental factor, and a specific diagnosis of the illness. He writes to the authors of the survey and asks for permission to perform high resolution studies, using his state board issued general practitioner credentials to perform high resolution correlations between his data and the survey data. He provides the calculations he wants to perform as computer programs in a file. Along with the computer programs, he also sends his own credentials.

The stakeholders in the survey inspect the computer programs and the doctor's credentials. They send back a package of instructions to be loaded together with the governed derived resource, and a signed assertion that the doctor is allowed to view high resolution data.

The doctor then loads the original governed derived resource together with the new instruction package, and his signed credentials. In the secure environment the new instructions are recognized as being from the survey stakeholders. The signed credentials are also recognized. The governed derived resource now incorporates the new instructions into itself. This produces a governed derived resource that acts as the old governed derived resource in all cases except when it operates in the context of the doctor's credentials, running against his special computations.

Personalized Healthcare

Susan uses an online service to track her exercise regimen. The service maintains a personal health record and stores information gathered from various biometric sensors that Susan uses to track her health, including a weight scale and a multi-function fitness watch that records (once per second) Susan's activity level, location, heart rate, pulse oximetry, and galvanic skin response (GSR).

Susan uploads the data from her watch to her PC (e.g., using Bluetooth, BluetoothLE, ANT+, 6LowPAN, a USB connection, a small, low-power radio base station attached to her computer, and/or the like), which automatically uploads the data over the Internet into a service. Uploads happens over a secure channel using standard technology such as the HTTPS protocol.

Through the service, Susan locates a personal trainer to help her fine-tune her routine. After establishing a relationship with the trainer through the service, the trainer generates a request for access to Susan's data—every Sunday evening, the trainer would like to receive a list of each of Susan's workouts during the week, and, for each workout, statistics like (a) the start and end times of the workout, (b) the distance traveled during the workout, (c) the starting heart rate, peak heart rate, and the length of time during which Susan was within 5% of the peak heart rate, and (d) the galvanic skin response (GSR) at peak heart rate.

The service provides the trainer a user interface through which to make this request and send it to Susan. The request for data contains a human-readable description of the data to be collected each week. Susan receives the request and approves it, but attaches an additional condition that only data collected between 7 am and 7 pm can be viewed.

Each Sunday evening, the service collects all of the data that Susan has generated during the preceding week and packages it as a single resource to be sent to her personal trainer for review.

The service collects all of the data for the week—in its raw format—into a single bundle and encrypts the bundle with a unique symmetric key, generated by the service.

The service generates a rule that allows the trainer access to this data. This rule may be based, for example, on some digital representation of the relationship between Susan and the trainer that is evaluated when the data package is accessed by the trainer.

Further, the service generates a set of computations to associate with the data package that compute, for each workout, the elements that the trainer has requested. These computations are written to run on a virtual machine embedded in client software that the trainer uses to review the data.

The service creates a license object that cryptographically links together the data package, the rules, and the computations. To provide one example instantiation, the license object may contain some or all of the following subcomponents:
  A data structure that binds the data package to an identifier, which contains the identifier and a cryptographic hash of the data itself,
  A data structure that binds the symmetric encryption key used to encrypt the data package to a key identifier, containing the key identifier and the actual key,
  A series of data structures, one for each rule, that bind the rules to their respective identifiers by packaging the rule identifiers together with cryptographic hashes of the byte codes of the executable rules,
  A series of data structures, one for each computation, that bind the computations to their respective identifiers by packaging the computation identifiers together with cryptographic hashes of the byte codes of the executable computations,
  A data structure containing the identifier of the data package and the identifier of the key used to encrypt the data,
  A data structure containing the identifier of the data package and the identifier of the rule set to be used to govern access to the data package,
  A data structure containing the identifier of the data package and the identifiers of the associated computations that will produce views of the information in the data package,
  The set of rules, in byte code format, to be executed by a virtual machine by the receiver,
  The set of computations, in byte code format, to be executed by a virtual machine by the receiver, and/or
  Metadata that is used to establish what the data in the package represents (e.g. that it was Susan's data, the week during which it was collected, etc.).

The personal trainer uses a software package that allows him to explore the data for all of his clients. This software is built using a software development kit (SDK) that implements a secure execution environment for accessing the data. On Monday morning, the trainer opens and starts the software package, which connects to the service and downloads any new information that he may have received from his clients.

To review Susan's data, the trainer clicks on Susan's name in a user interface presented by the software. The software may do several things in its secure processing environment, including some or all of the following, for example:
  Uses metadata in the various license objects it knows about to identify Susan's data packages (this information may be indexed in some local database),
  Opens the latest week's license object and uses the data structures linking the data package to the rule set to find and load the rules associated with the data package,
  Executes the byte codes that instantiate the rules and makes a decision as to whether to continue processing based upon whether the conditions expressed in the rules are met,
  Assuming the rules have been successfully evaluated, uses the data structure binding the data package to the encryption key to obtain the key and decrypt the data,
  Uses the data structures binding the data package to its computations to load and execute the computations, which produce several views of the data package, one for each computation,
  Makes the results of these computations available to the user interface portions of the software package for display,
  Sends an audit record back to the online service, which Susan can check periodically to determine how her data is being used.

The trainer sees the results of these computations in his user interface. Note that the underlying data from which these results were derived was not exposed to the trainer, so that, for example, the trainer cannot learn where the workouts occurred, even though that information is contained in the raw data uploaded by Susan and sent to the trainer in the data package.

After evaluating Susan's data for several weeks, the personal trainer wants to encourage Susan to increase her stamina by doing her workouts on more varied terrain. In order to assess the effectiveness of this regimen, the trainer would like to have information about where Susan is exercising so that he can plot it on a map of the area and determine whether she is going uphill, on a relatively flat area, etc. He wishes to receive this data along with detailed heart rate data so that he can correlate heart rate against location. The trainer uses an interface provided by the online service to request this additional information from Susan.

Susan receives the request, but does not feel comfortable giving the trainer access to detailed location information. After all, she has never met the trainer in person and is somewhat cautious about giving out such information. However, she does understand the trainer's reasons for asking for this data, and wishes to support his analysis, so rather than accepting the trainer's request, Susan herself uses an interface at the online service to create a computation that allows access to the altitude data, but not latitude and longitude.

The service interface presents a structured browser for different computations that are available in a template library. The browser presents computations pertaining to different types of data, such as 'Location', 'Fitness', etc.

Susan browses to the 'Location' area and notices that several computations are available to her: 'Full location information', 'Latitude/Longitude', 'Altitude'.

Susan selects 'Altitude', and the interface then allows her to select the data resolution for the computation, both temporally and spatially. For example, Susan may select 'Every 30 seconds' or '5 minute trailing average' for temporal resolution and 'Full resolution' or 'Randomized within +/−10 m' for spatial resolution.

Using a similar procedure, Susan selects a computation that provides heart rate data on 30-second intervals.

Once Susan has selected the computations she wishes to apply, she uses an additional interface to authorize the personal trainer to obtain this computation. From then on (or until Susan revokes the authorization) this computation will be included as part of the weekly report sent to the trainer.

The trainer begins receiving the altitude and detailed heart rate data, which he uses to assess the effectiveness of Susan's workout and provide feedback. After evaluating one week's worth of data, he finds this new information useful and makes a request for similar information on Susan's past data, which Susan authorizes. As a result, the trainer receives new license objects from the online service that provide the altitude/heart rate computations on data packages that he has already received and stored; the service does not need to retransmit the data packages themselves, only the new license objects.

After a couple of months on the new regimen, it appears that Susan's cardiovascular efficiency is not improving in the expected manner. Her workouts move in fits and starts, with frequent rests in the middle. The trainer, who works for an organization with doctors specializing in sports medicine on staff, would like to get some input from a staff physician, who works from a different location. Through the service, the trainer asks Susan if that would be acceptable, and she agrees. The trainer forwards the last month's worth of Susan's data directly to the physician. The data packages and licenses are included.

The physician attempts to open the data to run the computations, and (since he is not yet authorized to access the data at all) is prompted by his software to request authorization from Susan. He does so, and an authorization request is sent to Susan, who approves it.

After analyzing the data, the physician beings to suspect a problem with poor oxygenation, and, through the online service, requests additional access to Susan's pulse oximetry data, which Susan approves for the physician. Note that the trainer does not have access to the same data; the service has created separate computations for the pulse oximetry data for the physician and sent licenses containing those computations to the physician only.

The physician draws some conclusions from the data and provides his recommendations back to the trainer, who modifies Susan's regimen to reflect the physician's input. Her cardiovascular performance begins to improve.

At some later time, in reviewing the use of her data in the service and the active authorizations, Susan realizes that the physician still has access to her information and chooses to disable this access, since the consultation has completed. The licenses that were issued to the physician are marked as invalid, the physician's software is notified of this fact, and no future licenses are created or sent to the physician under this authorization. In other embodiments, the license might expire automatically after a specified period of time.

Video Download Service

Ian subscribes to an online movie service that gives him unlimited access to a broad variety of movies for all of his various rendering devices.

The service is designed for download and persistent storage of the programs, as opposed to a more streaming-oriented model. Streaming may be emulated by progressive download of the video, but even in this model, a license is obtained first, and the rules evaluated, before the progressively-downloaded stream is rendered.

The service offers a number of subscription tiers, including a standard-definition free tier, supported by advertising. This is Ian's option, initially. Other options (on a fee schedule) include a standard-definition offering with no ads, and a high-definition offering.

The service is designed to provide high definition video files to all customers over a peer-to-peer distribution network. The logistics of distributing multiple versions and resolutions of each movie were deemed to be too complex, so every customer receives exactly the same high-definition video file, regardless of their subscription tier.

The video files are distributed separately from licenses. When a customer requests a license, the license contains computations that derive the particular customer's view of the data, providing to the rendering system exactly the video stream that the customer is entitled to view.

In the case of the free, ad-supported standard definition tier, three computations are contained in each license: (i) a computation that extracts a standard-definition stream from the packaged video (ii) a computation that periodically downloads advertising files from an ad server and inserts them into the output stream, falling back to some default ads if the ad server is not reachable (iii) a computation that sends an audit record of the ad impression back to the ad server.

These computations are bound to the video files much as described in the previous example.

These computations are performed in the client software by a secure computing environment that evaluates the licenses, decrypts the content, and applies output computations to the content before returning it to the client's native rendering engine.

When a customer subscribes to a premium tier—which costs money—the requirement to apply one or both of these output computations before rendering is removed.

The service is designed to maximize ad revenue by allowing customers to freely distribute the protected content. If the recipient of the protected content is a paid subscriber, he may transparently obtain licenses to render the content at the resolution he has paid for. If the recipient is not a subscriber, he cannot render the video at all until he installs the client software. Directly distributed videos are bundled with a default license that lets the recipient view the standard definition video with ads.

Ian downloads a movie onto his tablet before going on a business trip. He likes the movie so much that he wants to give a copy to his friend Jim. He simply copies the movie file (which contains the packaged video content and the default license) onto Jim's system, and Jim is able to watch the movie.

After enjoying the movie, Jim decides to pay for a subscription to the service. Once he does so, he obtains licenses for the content he has that allow for rendering without advertisements. These licenses are downloaded very quickly, and the upgrade takes effect instantly, without having to re-download the relatively large video files.

In an attempt to be more family-friendly, the movie service enters into a partnership with an organization called 'Movies4Families'. This organization reviews all of the films offered by the service and determines which scenes may be inappropriate for younger viewers, categorizing them by type (e.g. mild violence, swearing, nudity, innuendo, etc.).

For each such scene, the organization creates computations that modify the output stream to eliminate the objectionable scenes, blank the screen for two seconds, bleep the audio, splice in an alternate storyline, or take whatever other measure is required to make the movie more family friendly.

These computations depend upon the user settings. For example, if a parent configures their child's client for a 10 year old, then certain default computations may be applied that differ from the computations that would apply for a 15 year old.

The parental controls may contain the ability to fine-tune the filtering as well.

Ian signs up for the Movies4Families service. As a result, for every movie he downloads from the main video service, his client will also pull computations from the Movies4Families service that apply the appropriate filters. When movies are rendered on his young son's device, the filters ensure that he is not seeing the inappropriate sections.

Technically, the computations created by Movies4Families are bound to the movies they govern in the same way that the video service bound them—by creating an object that binds together the identifier for the video and the identifier for the computation.

In this example, suppose that the video client used in the movie service will only trust licenses and computations that are digitally signed by an entity holding a certified key, where the certified key was issued by the movie service itself. In this case, the movie service has issued to Movies4Families a certified key that allows them to digitally sign the objects that associate the movie and the filtering computations.

Movies4Families sends to clients the computation itself and the binding between the computation and the movie, all digitally signed with the key that derives from the video service. As such, the video client recognizes the signature, and will apply the requested computations at the time of rendering.

The function of the filter depends upon settings in the client. For example, Ian and his young son may both watch the same movie using their respective clients, but because the son's client has been configured for a 10 year old, his stream may be heavily filtered, whereas Ian sees the original unfiltered film. This example shows how state variables maintained at the client side may impact the computations performed.

Digital Remixing and Mashups

John is a musician who has created a seminal funk track and distributed it digitally with a license that does not allow copying.

Malcolm is a DJ that wishes to make (and sell) a digital mashup incorporating a 4 second sample of John's original track, mixed in with several other audio tracks.

Using digital mixing software, Malcolm creates a computation that extracts the relevant 4 seconds from John's track, filters it through a flanger, and puts it into his mix at the appropriate points.

Malcolm sends this computation to John, who approves of this particular use so long as he is paid a half a cent per play. He signs the computation, binding it to his original track, and adds a post condition that sends him an audit record each time the excerpt is played, allowing him to track the usage for billing.

Malcolm packages his own mashup, including John's original track and the computation that extracts and filters the 4 second sample. On rendering, John's computation is applied at the appropriate points and John eventually gets paid for the use of his original sample.

Genetics

Elizabeth enrolled in a clinical trial that required that she have her genome sequenced. The trial was to investigate the relationship between certain genotypes and optimal dosing for an anti-cancer medication.

Elizabeth was first required to set up an account at a genetic information service that was to store and manage access to her genome. Once she had registered this account, the service generated a random sample number (and barcode), which she printed out and took to the sequencing lab.

Elizabeth provided her sample, and the lab technician scanned the barcode, associating Elizabeth's genome sequence with the random sample number.

The genome was uploaded to the information service securely, and the random sample number was used to look up Elizabeth's account and create a binding between her genome and her other account information.

The genetic information service was created in such a way that the gene sequence itself may be freely copied among multiple research facilities in a protected form, but permission to decrypt or access that sequence must be given by Elizabeth herself, as authenticated by the service. This architecture allows Elizabeth's gene sequence (which is a rather large file of several gigabytes) to be distributed to researchers who may be interested in using it in a study, but with all such uses audited and controlled by Elizabeth.

When Elizabeth registered for the clinical trial, she was asked to approve certain queries against her genome that the scientists designing the study had asked for. For example, suppose the study was about breast cancer, and the researchers were asking for access to information about the BRCA1, BRCA2, and TP53 genes.

Because Elizabeth approved these uses of her genome, for these particular researchers, the genetics service created several computations to run against Elizabeth's genome that extract the required information and provide it to the authorized parties. These computations have auditing requirements as well, which cause audit reports to be sent to the genetics service each time a computation is performed. Thus Elizabeth can track how her information is being used, and by whom. The service binds these computations to the genome by digitally signing a data structure that cryptographically binds together the genome and the computation, e.g., as described elsewhere herein.

At some later date, one of the researchers involved in the study discovers what he believes to be a new connection between the performance of the anti-cancer drug and a heretofore unknown genetic mechanism.

Using the genetics service, the researcher performs a query to identify a likely research cohort from among all people that have accounts in the service. This query identifies people who have participated in previous studies on breast cancer without revealing their identities to the researcher.

The researcher uncovers 130 candidates for his new study, but he does not know who they are. There may be other candidates in the system, but they have signaled that they are not interested in participating in future studies, so they are not shown as candidates to the researcher.

Using an interface provided by the genetics service, the researcher uploads a computation into the system that will interrogate the genome to test for the hypothesized patterns.

The researcher created this computation using software in his lab, and verified it by running it against genomes to which he had full access.

He uploaded the computation to the service through an interface that allowed him to specify metadata about the computation (what it would be used for, etc.) and to digitally sign the computation using a key that he controls.

Using the genetics service, the researcher asks each of the 130 candidates if they are willing to participate. For those that agree, the service binds the new computation to their respective genome sequences with the condition that only the originator of the computation may run it—the holder of the private key corresponding to the public key used to sign the computation.

These computations are forwarded to the researcher as they come in, and the researcher applies them to the genome sequences he already has in his lab, or downloads copies of the relevant genome sequences if he no longer has copies.

The researcher discovers something peculiar about Elizabeth's particular sequence and uses the service to send her an anonymous message asking her to contact him. Over the phone, the researcher explains what he is finding, and asks Elizabeth for permission to access her whole sequence so that he may investigate further.

Using the service, Elizabeth creates a computation, binds it to her genome, and sends it to the researcher. The computation allows that specific researcher to run any additional computation against her genome, so long as he runs it in a trusted environment, and requires that each such access be audited.

In effect, Elizabeth has delegated to the researcher the ability to bind any new computations to her genome, so long as he is authenticated and using the trusted environment to perform the computation. This allows Elizabeth a degree of control over her genome that she would not have if she simply gave the researcher an unprotected file.

Technically, this might take the form of a pre-computation required by Elizabeth that authenticates the next computation in the chain (the one proposed by the researcher) according to conditions that Elizabeth has set. It might also be implemented as a post-condition that first runs the researcher's proposed computation and then allows or disallows output depending upon the conditions.

The researcher may request the ability to bind other types of computations (for example, to allow collaborators to interrogate Elizabeth's genome), but he must first obtain Elizabeth's permission to bind and distribute these computations.

Scientific Research

Josh is a social sciences researcher who is publishing a paper in an area with political overtones. He knows in advance that his findings will be controversial among certain political groups, and that he will be accused of filtering the data to suit his own political agenda. He needs to be able to prove that he did not, for example, omit inconvenient samples, but he needs to be able to prove this without revealing the raw data itself, which might be used to identify his research subjects.

Josh collects his data in a well-defined format, carefully documenting the source of his data (and ideally collecting signatures or biometrics that can be used for later verification). He creates a series of programs as part of his research that process the data and extract statistics. Once he has made some conclusions about the data, he packages the data into one container and encrypts it with a symmetric key that he generated.

Josh packages the computations that he has used to compute his final results, including, for example: A series of computations that produce certain statistical tables to appear in his paper, computations that produce the various figures/graphs for his paper, and/or the like.

Josh binds these computations to his raw data, using techniques disclosed elsewhere herein, and puts the packaged data and computations together on a publicly-accessible website.

Josh publishes his paper. When a critic charges him with selective data manipulation, Josh directs the critic to the website, where he may download Josh's original data package and computations to perform the experiments himself.

The critic downloads the data set and verifies that the data have not been tampered with since being packaged, that the computations produce the results shown in Josh's paper, and that the computations themselves, which are in a human-readable format, do not attempt to eliminate data that do not support the conclusion.

After verifying these things, the critic still does not accept Josh's conclusions. The critic believes that Josh has ignored the biasing influence of a particular factor. The critic creates a modified version of one of Josh's computations that accounts for the biasing factor, and proposes the computation to Josh.

Josh accepts the criticism as valid, signs the computation to bind it to his data set, and sends the binding back to the critic, who runs the new computation against the data. As it turns out, Josh's conclusions still hold, and Josh now includes the critic's proposed computation as part of his public package for verifying his results.

It will be appreciated that there are number of ways to implement the systems and method described herein. For example, in some embodiments the systems and methods describe herein can be used in connection with the digital rights management technology described in the '693 application, and/or the digital rights management or service orchestration technology described in commonly assigned U.S. patent application Ser. No. 10/863,551 (Publication No. 2005/0027871) ("the '551 application") (the contents of both the '693 application and the '551 application are hereby incorporated by reference in their entirety), although any other suitable DRM and/or services technology could be used instead.

Figure 3:
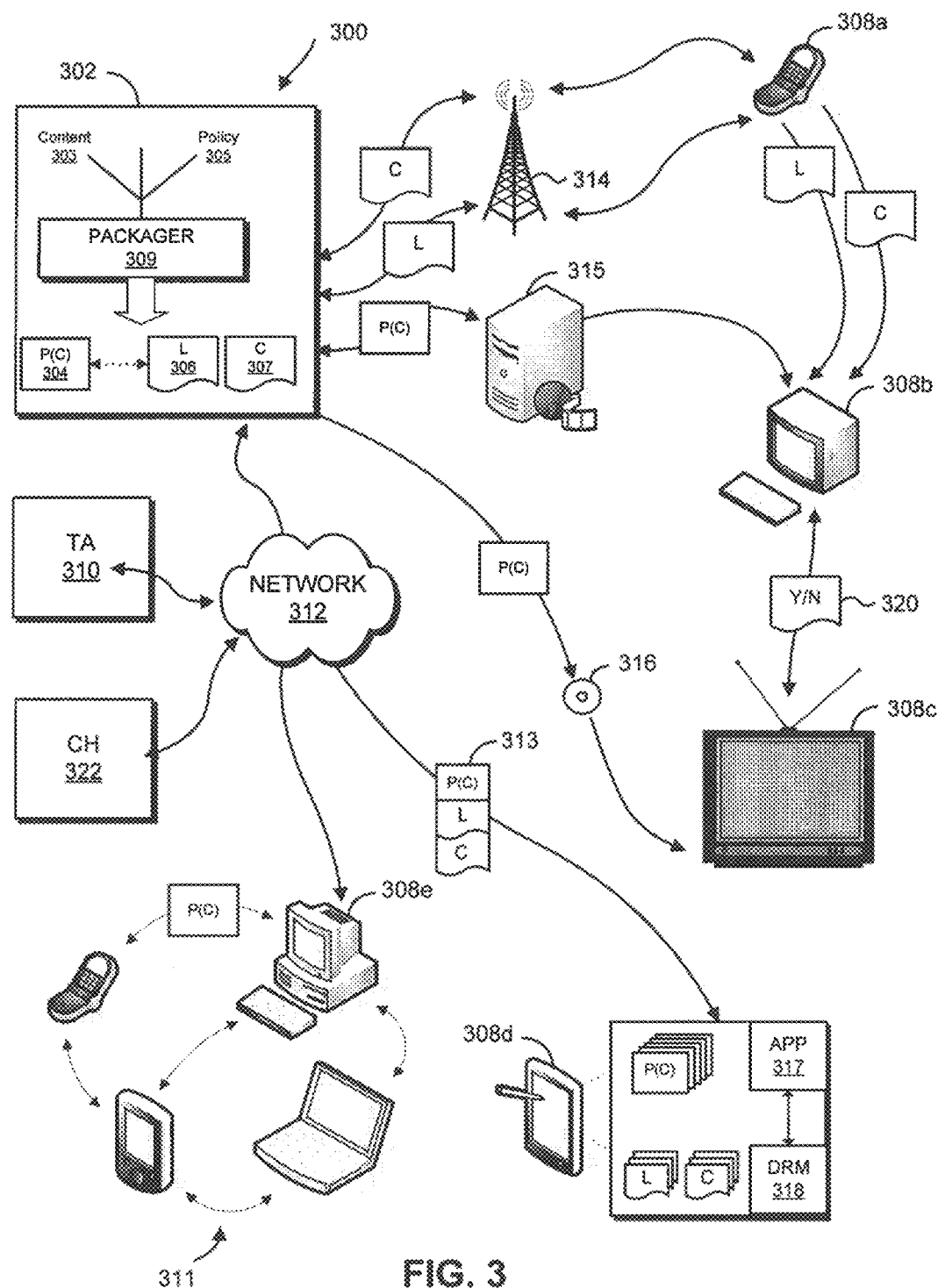
FIG. 3 shows an illustrative system for governing electronic resources.

FIG. 3 shows an illustrative system 300 for governing electronic content, including derived resources such as those described herein. As shown in FIG. 3, an entity 302 holding rights in electronic content 303, packages the content for distribution and consumption by end users 308a-e (referred to collectively as "end users 308," where reference numeral 308 refers interchangeably to the end user or the end user's computing system, as will be clear from the context). For example, entity 302 may comprise a content owner, creator, or provider, such as an individual, a researcher, a musician, movie studio, publishing house, software company, author, mobile service provider, Internet content download or subscription service, cable or satellite television provider, the employee of a corporation, or the like, or an entity acting on behalf thereof, and content 303 may comprise any electronic content, such as personal healthcare data, genetic information, research results, digital video, audio, or textual content, a movie, a song, a video game, a piece of software, an email message, a text message, a word processing document, a report, or any other entertainment, enterprise, or other content.

In the example shown in FIG. 3, entity 302 uses a packaging engine 309 to associate a license 306 and one or more computations 307 with the packaged content 304. License 306 is based on the policies 305 or other wishes of entity 302, and specifies permitted and/or prohibited uses of the content and/or one or more conditions that must be satisfied in order to make use of the content, or that must be satisfied as a condition or consequence of use. Computations 307 provide various views of the content, in accordance with the policies specified by license 306. The content may also be secured by one or more cryptographic mechanisms such as encryption or digital signature techniques, for which a trust authority 310 may be used to obtain the appropriate cryptographic keys, certificates, and/or the like.

As shown in FIG. 3, packaged content 304, licenses 306, and computations 307 can be provided to end users 308 by any suitable means, such as via a network 312 like the Internet, a local area network 311, a wireless network, a virtual private network 315, a wide area network, and/or the like, via cable, satellite, broadcast, or cellular communication 314, and/or via recordable media 316 such as a compact disc (CD), digital versatile disk (DVD), a flash memory card (e.g., an Secure Digital (SD) card), and/or the like. Packaged content 304 can be delivered to the user together with license 306 and/or computations 307 in a single package or transmission 313, or in separate packages or transmissions received from the same or different sources.

The end user's system (e.g., a personal computer 308e, a mobile telephone 308a, a television and/or television set-top box 308c, a tablet 308d, a portable audio and/or video player, an eBook reader, and/or the like) contains application software 317, hardware, and/or special-purpose logic that is operable to retrieve and render the content. The user's system also includes software and/or hardware, referred to herein as a digital rights management engine 318, for evaluating the license 306 and computations 307 associated with the packaged content 304 and enforcing the terms thereof (and/or enabling application 317 to enforce such terms), such as by selectively granting the user access to the content only if permitted by the license 306 and in accordance with computations 307. Digital rights management engine 318 may be structurally or functionally integrated with application 317, or may comprise a separate piece of software and/or hardware. Alternatively, or in addition, a user's system, such as system 308c, may communicate with a remote system, such as system 308b, (e.g., a server, another device in the user's network of devices, such as a personal computer or television set-top box, and/or the like) that uses a digital rights management engine to make a determination 320 as to whether to grant the user access to content previously obtained or requested by the user.

The digital rights management engine, and/or other software on the user's system, or in remote communication therewith, may also record information regarding the user's access to or other use of the protected content. In some embodiments, some or all of this information might be communicated to a remote party (e.g., a clearinghouse 322, the content creator, owner, or provider 302, the user's manager, an entity acting on behalf thereof, and/or the like), e.g., for use in tracking use of the owner's personal information, allocating revenue (such as royalties, advertisement-based revenue, etc.), determining user preferences, enforcing system policies (e.g., monitoring how and when confidential information is used), and/or the like. It will be appreciated that while FIG. 3 shows an illustrative architecture and a set of illustrative relationships, the systems and methods described herein can be practiced in any suitable context, and thus it will be appreciated that FIG. 3 is provided for purposes of illustration and explanation, not for purposes of limitation.

Figure 4:
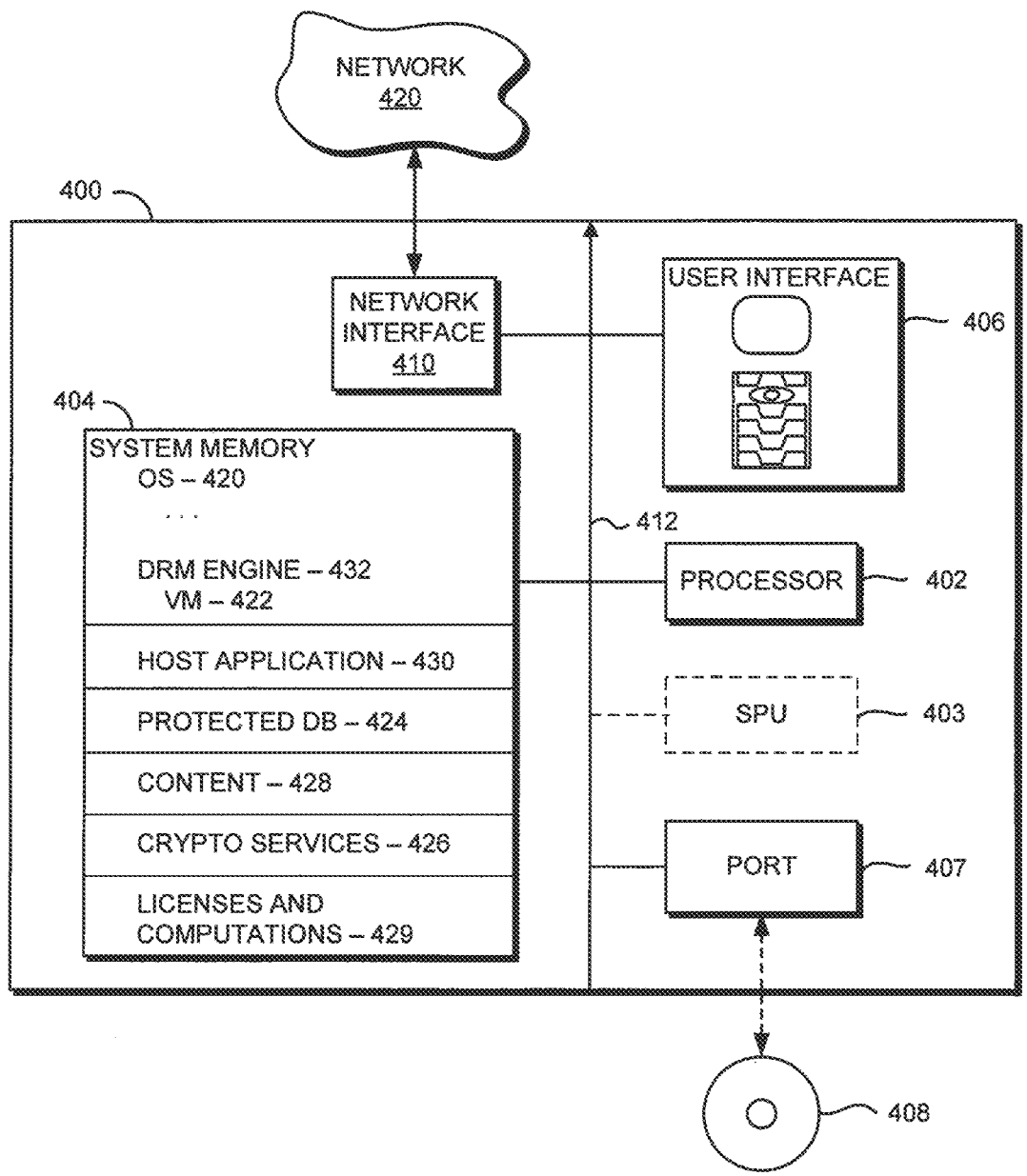
FIG. 4 shows a more detailed example of a system that could be used to practice embodiments of the inventive body of work.

FIG. 4 shows a more detailed example of a system 400 that could be used to practice embodiments of the inventive body of work. For example, system 400 might comprise an embodiment of an end user's device 308, a content provider's device 302, and/or the like. For example, system 400 may comprise a general-purpose computing device such as a personal computer 308e or network server 315, or a specialized computing device such as a cellular telephone 308a, personal digital assistant, portable audio or video player, television set-top box, kiosk, gaming system, or the like. System 400 will typically include a processor 402, memory 404, a user interface 406, a port 407 for accepting removable memory 408, a network interface 410, and one or more buses 412 for connecting the aforementioned elements. The operation of system 400 will typically be controlled by processor 402 operating under the guidance of programs stored in memory 404. Memory 404 will generally include both high-speed random-access memory (RAM) and non-volatile memory such as a magnetic disk and/or flash EEPROM. Some portions of memory 404 may be restricted, such that they cannot be read from or written to by other components of the system 400. Port 407 may comprise a disk drive or memory slot for accepting computer-readable media 408 such as floppy diskettes, CD-ROMs, DVDs, memory cards, SD cards, other magnetic or optical media, and/or the like. Network interface 410 is typically operable to provide a connection between system 400 and other computing devices (and/or networks of computing devices) via a network 420 such as the Internet or an intranet (e.g., a LAN, WAN, VPN, etc.), and may employ one or more communications technologies to physically make such connection (e.g., wireless, Ethernet, and/or the like). In some embodiments, system 400 might also include a processing unit 403 that is protected from tampering by a user of system 400 or other entities. Such a secure processing unit can help enhance the security of sensitive operations such as key management, signature verification, and other aspects of the digital rights management process.

As shown in FIG. 4, memory 404 of computing device 400 may include a variety of programs or modules for controlling the operation of computing device 400. For example, memory 404 will typically include an operating system 420 for managing the execution of applications, peripherals, and the like; a host application 430 for rendering protected electronic content; and a DRM engine 432 for implementing some or all of the rights management functionality described herein. As described elsewhere herein, DRM engine 432 may comprise, interoperate with, and/or control a variety of other modules, such as a virtual machine 422 for executing control programs, and a protected database 424 for storing sensitive information, and/or one or more cryptographic modules 426 for performing cryptographic operations such as encrypting and/or decrypting content, computing hash functions and message authentication codes, evaluating digital signatures, and/or the like. Memory 404 will also typically include protected content 428 and associated licenses and computations 429, as well as cryptographic keys, certificates, and the like (not shown).

One of ordinary skill in the art will appreciate that the systems and methods described herein can be practiced with computing devices similar or identical to that illustrated in FIG. 4, or with virtually any other suitable computing device, including computing devices that do not possess some of the components shown in FIG. 4 and/or computing devices that possess other components that are not shown. Thus it should be appreciated that FIG. 4 is provided for purposes of illustration and not limitation.

Although the foregoing has been described in some detail for purposes of clarity, it will be apparent that certain changes and modifications may be made within the scope of the appended claims. For example, while several examples have been described that make use of a DRM engine such as that described in the '693 application, it will be appreciated that embodiments of the systems and methods described herein can be implemented using any suitable software and/or hardware for governing content in accordance with rules or policy. It should be noted that there are many alternative ways of implementing both the processes and apparatuses described herein. Accordingly, the present embodiments are to be considered as illustrative and not restrictive, and the inventive body of work is not to be limited to the details given herein, but may be modified within the scope and equivalents of the appended claims.

What is claimed is:

1. A method for governing the use of a digital resource, the method comprising:
   receiving one or more programs associated with at least one user, wherein the one or more programs are configured to operate upon the digital resource when executed to generate a derived digital resource;
   associating one or more rules with the digital resource, wherein the rules correspond to one or more conditions for accessing the digital resource;
   associating the one or more programs with the digital resource; and
   receiving a request to generate the derived digital resource from a system associated with the at least one user;
   executing the one or more programs to generate the derived digital resource by performing at least one computation on information contained in the digital resource, wherein the at least one computation comprises a mathematical transformation performed on at least a portion of the digital resource, which transformation comprises calculating an average of the at least a portion of the digital resource and which obscures the at least a portion of the digital resource and the digital resource contains information that is not included in the generated derived digital resource, and wherein executing the one or more programs comprises enforcing the one or more conditions for accessing the digital resource in connection with execution of the one or more programs; and
   transmitting the derived digital resource to the system associated with the at least one user.

2. The method of claim 1, in which at least one program is associated with a set of users rather than an individual user.

3. The method of claim 2, in which the set of users is specified by explicitly listing the users for whom the at least one program applies.

4. The method of claim 2, in which the set of users is specified by providing an attribute common to the set of users, such that the at least one program is required for any user to whom said attribute applies.

5. The method of claim 1, in which the generated derived resource is dependent upon at least one user, a set of users, or another principal to whom at least one program applies.

6. The method of claim 1, further comprising:
   receiving a new set of programs configured to operate upon the digital resource; and
   receiving a request for associating the new set of programs with the digital resource.

7. The method of claim 6, further comprising:
   approving the request for associating the new set of programs with the digital resource.

8. The method of claim 1, further comprising:
   cryptographically associating the one or more programs with the digital resource.

9. The method of claim 8, in which the association is made by creating a digitally signed document consisting of the pairing of a unique representation of the digital resource and a unique representation of the one or more programs to be associated with the digital resource.

10. The method of claim 9, in which the representation of the digital resource is the result of applying a one-way function.

11. A method for governing the use of a digital resource, the method comprising:
    receiving one or more programs associated with at least one user, wherein the one or more programs are configured to operate upon the digital resource when executed to generate a derived digital resource by performing at least one computation on information contained in the digital resource;
    associating one or more rules with the digital resource, wherein the rules correspond to one or more conditions for accessing the digital resource;
    associating the one or more programs with the digital resource; and
    receiving a request to generate the derived digital resource from a system associated with the at least one user;
    executing the one or more programs to generate the derived digital resource based on the digital resource, wherein the one or more programs comprise at least one computation that obscures at least a portion of the digital resource based in part on obfuscation information that is determined based on deterministic seed information such that a same principal receives a same generated derived digital resource, and the digital resource containing information that is not included in the generated derived digital resource, and wherein executing the one or more programs comprises enforcing the one or more conditions for accessing the digital resource in connection with execution of the one or more programs; and
    transmitting the derived digital resource to the system associated with the at least one user.

12. The method of claim 11, in which at least one program is associated with a set of users rather than an individual user.

13. The method of claim 12, in which the set of users is specified by explicitly listing the users for whom the at least one program applies.

14. The method of claim 12, in which the set of users is specified by providing an attribute common to the set of users, such that the at least one program is required for any user to whom said attribute applies.

15. The method of claim 11, in which the generated derived resource is dependent upon at least one user, a set of users, or another principal to whom at least one program applies.

16. The method of claim 11, further comprising:
    receiving a new set of programs configured to operate upon the digital resource; and
    receiving a request for associating the new set of programs with the digital resource.

17. The method of claim 16, further comprising:
approving the request for associating the new set of programs with the digital resource.

18. The method of claim 11, further comprising:
cryptographically associating the one or more programs with the digital resource.

19. The method of claim 18, in which the association is made by creating a digitally signed document consisting of the pairing of a unique representation of the digital resource and a unique representation of the one or more programs to be associated with the digital resource.

20. The method of claim 19, in which the representation of the digital resource is the result of applying a one-way function.

21. The method of claim 19, in which the representation of the digital resource is a unique identifier associated with the digital resource.

22. The method of claim 21, in which the unique identifier associated with the digital resource was assigned by a trusted third party.

* * * * *